(12) United States Patent
Mukai et al.

(10) Patent No.: US 8,902,871 B2
(45) Date of Patent: *Dec. 2, 2014

(54) WIRELESS BASE STATION AND WIRELESS COMMUNICATION TERMINAL AND WIRELESS COMMUNICATION SYSTEM

(75) Inventors: Tsutomu Mukai, Osaka (JP); Hitoshi Takai, Osaka (JP)

(73) Assignee: Panasonic Corporation, Osaka (JP)

( * ) Notice: Subject to any disclaimer, the term of this patent is extended or adjusted under 35 U.S.C. 154(b) by 156 days.

This patent is subject to a terminal disclaimer.

(21) Appl. No.: 13/607,931

(22) Filed: Sep. 10, 2012

(65) Prior Publication Data

US 2012/0331161 A1 Dec. 27, 2012

Related U.S. Application Data

(62) Division of application No. 12/493,364, filed on Jun. 29, 2009, now Pat. No. 8,284,744.

(30) Foreign Application Priority Data

Jun. 30, 2008 (JP) .................................. 2008-171583

(51) Int. Cl.
*H04W 4/00* (2009.01)
*H04L 29/06* (2006.01)
*H04W 12/08* (2009.01)
*H04W 88/02* (2009.01)

(52) U.S. Cl.
CPC ............. *H04W 12/08* (2013.01); *H04L 63/105* (2013.01); *H04W 88/02* (2013.01)
USPC .......................................................... 370/338

(58) Field of Classification Search
CPC ...................................... H04W 74/002–74/008
USPC ...................... 370/338, 329; 455/456.5, 456.6
See application file for complete search history.

(56) References Cited

U.S. PATENT DOCUMENTS

| 8,284,744 B2* | 10/2012 | Mukai et al. .................. 370/338 |
| 2004/0156346 A1 | 8/2004 | O'Neill |
| 2005/0130586 A1 | 6/2005 | Gnuschke |
| 2008/0176546 A1* | 7/2008 | Devico et al. ................. 455/418 |
| 2008/0182612 A1 | 7/2008 | Yoshida |

(Continued)

FOREIGN PATENT DOCUMENTS

| JP | 2003-199171 | 7/2003 |
| JP | 2004-048395 | 2/2004 |
| JP | 2006-287767 | 10/2006 |

*Primary Examiner* — Albert T Chou
(74) *Attorney, Agent, or Firm* — Wenderoth, Lind & Ponack, L.L.P.

(57) ABSTRACT

Provided is a wireless communication system transmitting information to a communication terminal moving through a spot wireless area. In an integrated base station, an external information communication section controls communication with a server. A contents memory section stores contents received from the server. A wireless LAN communication section communicates with the communication terminal. A control section establishes connection with the communication terminal using a first connection not requiring an authentication procedure for connection with the communication terminal, or using a second connection requiring the authentication procedure for connection with the communication terminal. An access control (restriction) section permits access from the communication terminal to the contents memory section and prohibits access to the server when a type of connection with the communication terminal is the first connection, and permits access from the communication terminal to the contents memory section and to the server in the case of the second connection.

17 Claims, 24 Drawing Sheets

(56) References Cited

U.S. PATENT DOCUMENTS

2009/0233542 A1 9/2009 Gratton
2009/0298515 A1 12/2009 Czaja
2011/0141887 A1 6/2011 Klein

* cited by examiner

F I G. 1 6

| TAG / CONTENTS | NEWS | COUPON | RESTAURANT | ENTERTAINMENT |
|---|---|---|---|---|
| NEWS | ○ | | | |
| MOVIE INFORMATION | ○ | | | ○ |
| A CLOTHING STORE INFORMATION | | ○ | | |
| B RESTAURANT INFORMATION | | ○ | ○ | |
| C RESTAURANT INFORMATION | | ○ | ○ | |
| D MUSEUM INFORMATION | | | | ○ |
| E MOVIE THEATER INFORMATION | | | | ○ |

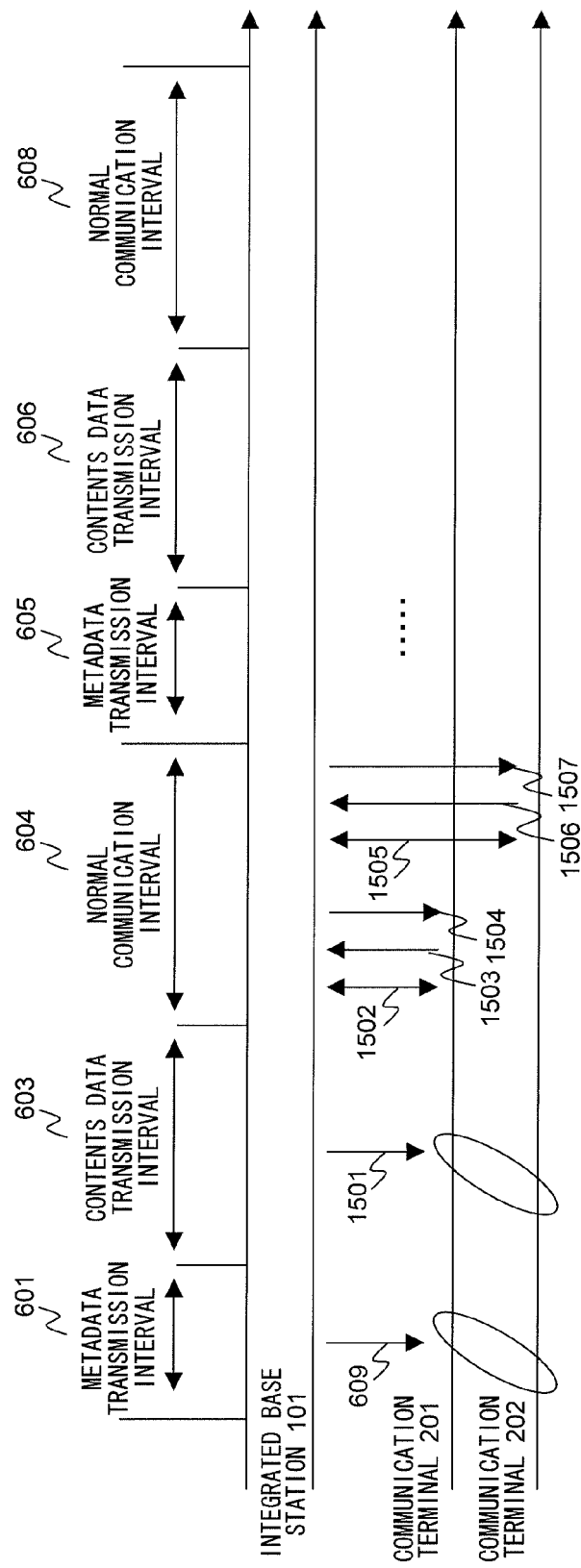

F I G. 1 9 A
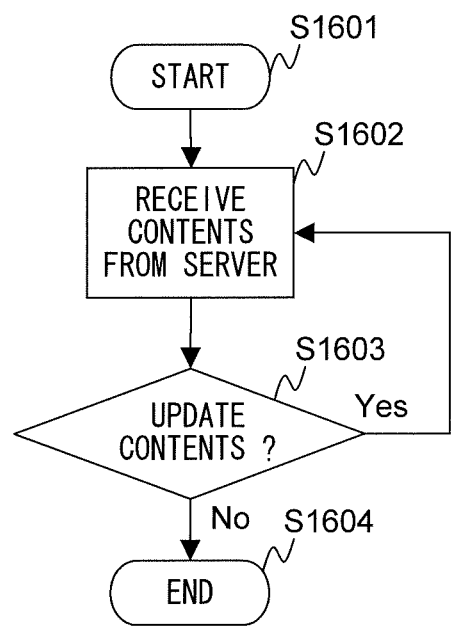

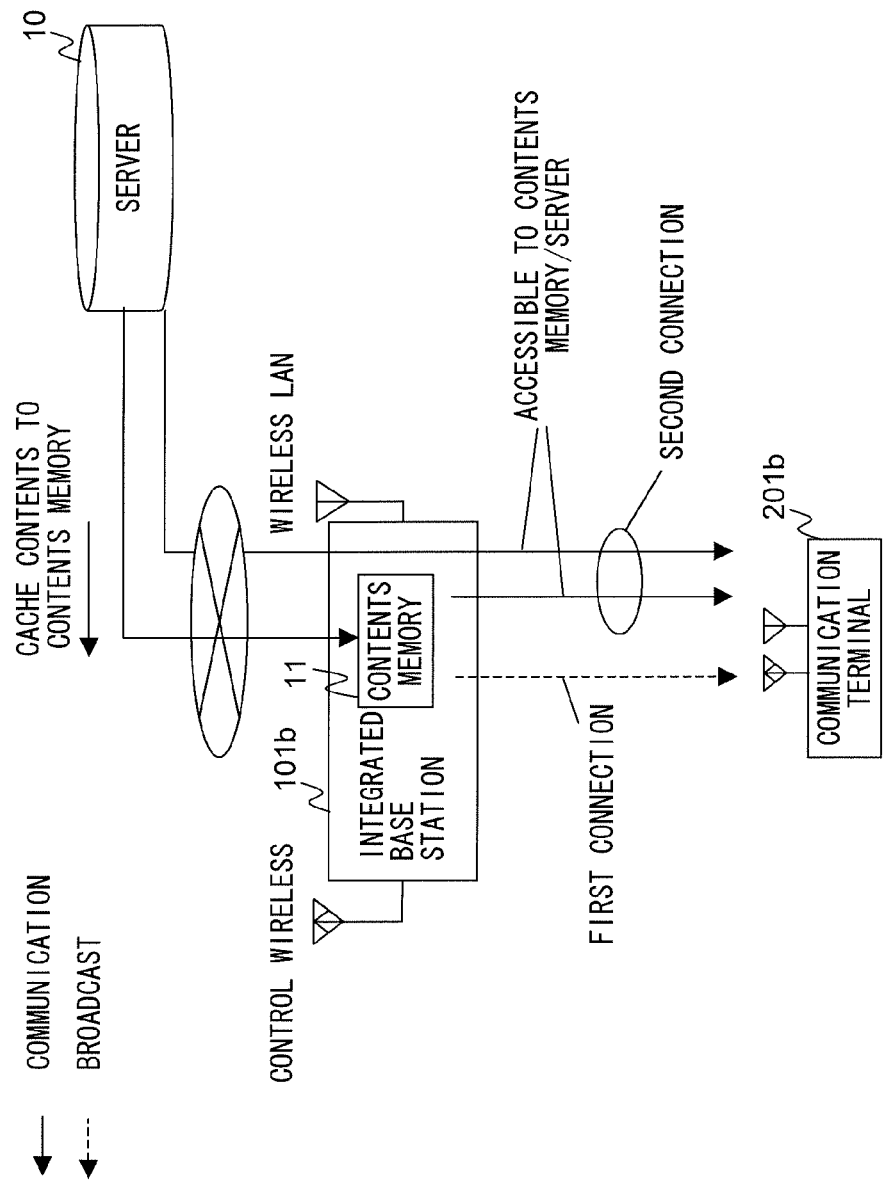

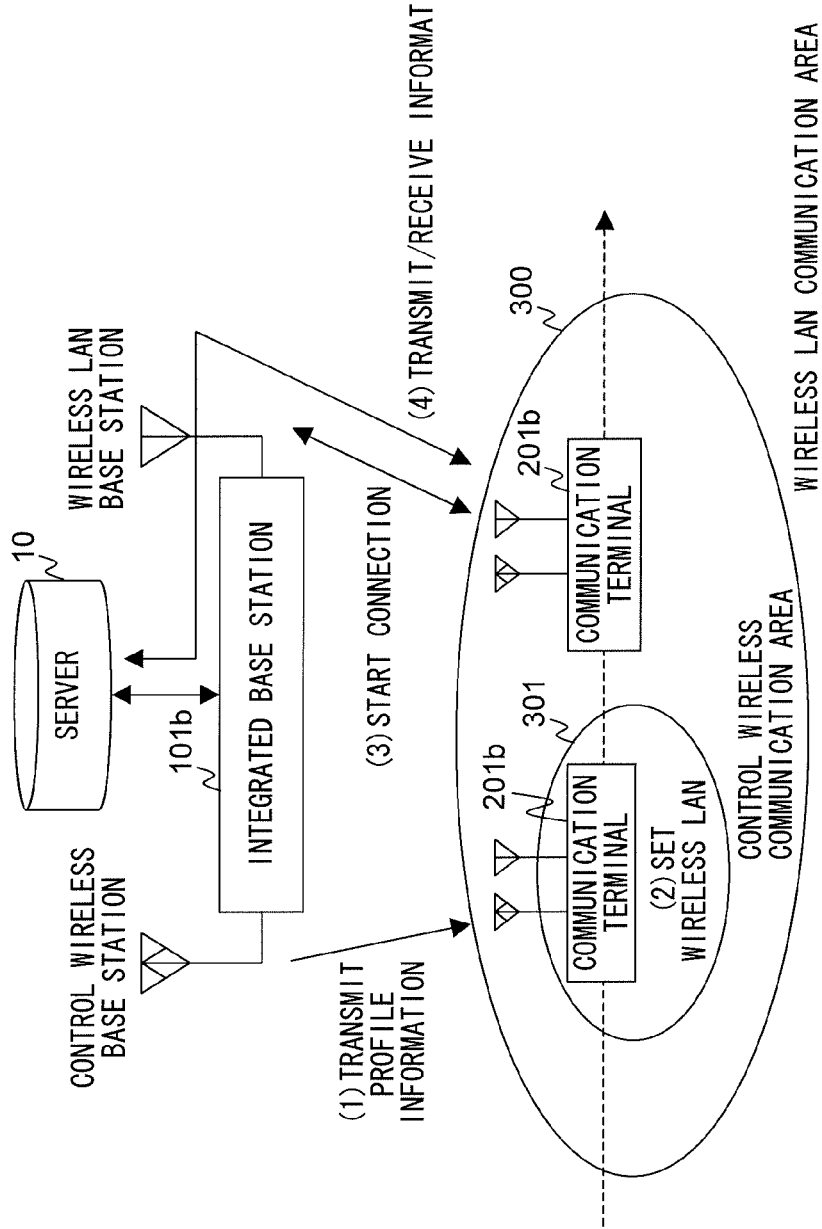

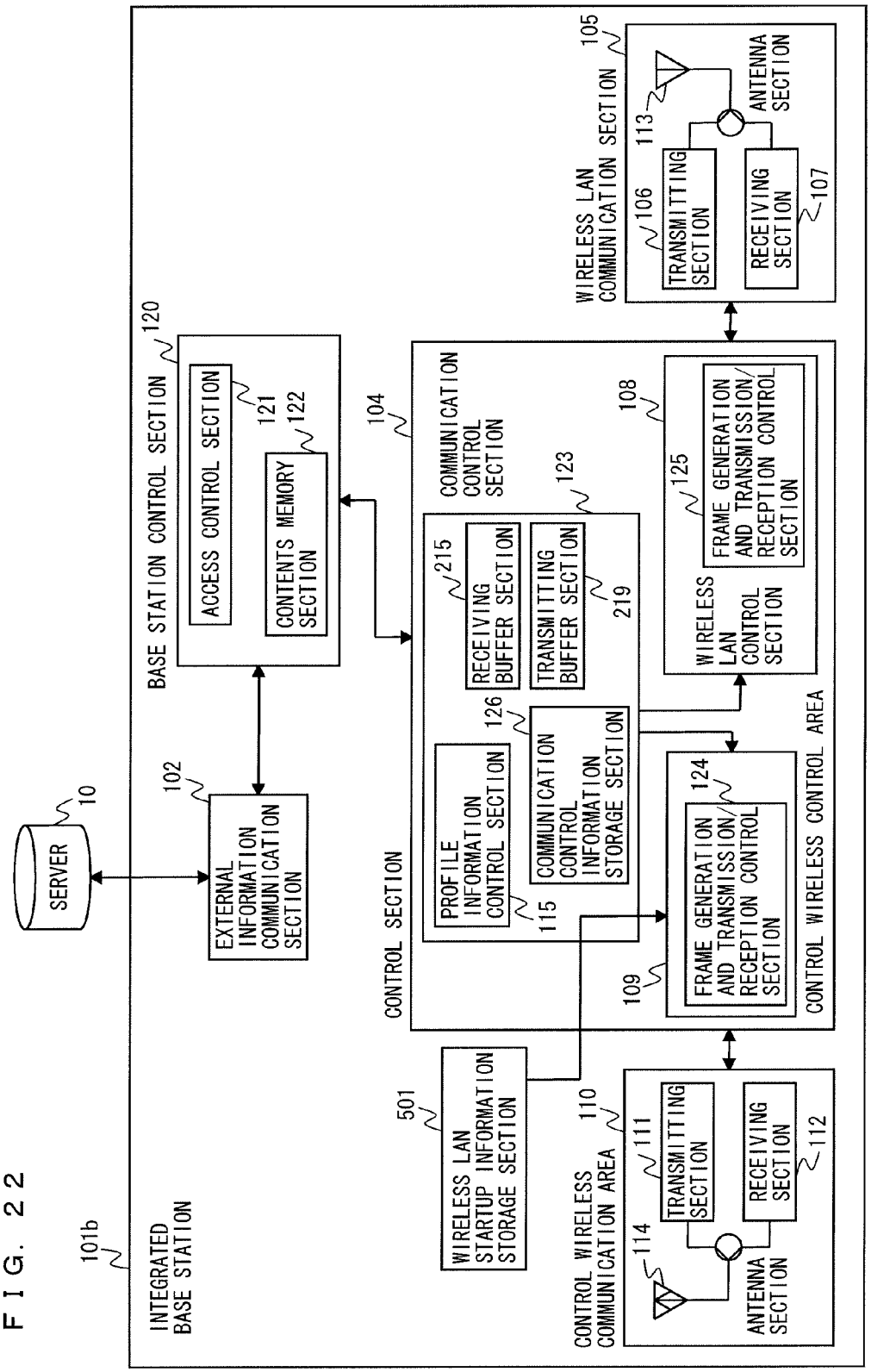

WIRELESS BASE STATION AND WIRELESS COMMUNICATION TERMINAL AND WIRELESS COMMUNICATION SYSTEM

This application is a divisional of application Ser. No. 12/493,364, filed Jun. 29, 2009 now U.S. Pat. No. 8,284,744.

BACKGROUND OF THE INVENTION

1. Field of the Invention

The present invention relates to a wireless base station, a wireless communication terminal, and a wireless communication system, and more particularly to a wireless base station, a wireless communication terminal that establishes connection with the wireless base station, and a wireless communication system which perform communication in a spot communication area.

2. Description of the Background Art

In recent years, portable equipment equipped with a communication function that meets the IEEE802.11 standard (hereinafter referred to as a wireless LAN communication function) is increasingly becoming widespread. In addition, an area of use is not limited to an office or a house, but areas usable as a so-called hotspot are rapidly increasing outdoors, although the area is an isolated spot communication area. In response to this, wireless LAN is not only limitedly mounted on such apparatuses as a personal computer or office equipment, but is also mounted to various apparatuses, including household electrical appliances. Particularly, the wireless LAN is increasingly used in various portable-type or in-vehicle type apparatuses such as a mobile phone.

In the IEEE802.11 standard, in order to establish connection between a communication terminal and a wireless LAN base station, the following basic process is required. First, the communication terminal scans all communication channels so as to receive beacons periodically sent by wireless LAN base stations. Next, the communication terminal specifies communication channels of the wireless LAN base stations, determines a wireless LAN base station desired to be connected, and decides whether or not connection with the wireless LAN base station is permissible by using an identifier, called an SSID (Service Set Identifier). When connection is permissible, a communication path between the wireless LAN base station and the communication terminal is encrypted by using an encrypting format typified by a WEP (Wired Equivalent Privacy), and a WPA (Wi-Fi Protected Access). Upon completion of recognition and encrypting, the communication terminal finally becomes capable of starting communication with the wireless LAN base station.

In the future, as a service using a wireless LAN-mounted apparatus, it is expected that a service of system, in which wireless LAN base stations are located outdoors, and when a communication terminal passes through a spot communication area of one of the wireless LAN base stations, information is transmitted/received between the communication terminal the wireless LAN base station, will be increasingly widely used. In the future, the communication terminal will not be merely used in a semi-fixed state, but will be used during walking. In addition, it is expected that the communication terminal will be increasingly used for high-speed movement such as movement by bus or by train, or used for a car navigation system equipped with a wireless LAN communication function. As the movement speed of the communication terminal is increased, there is need for reduction in time elapsing from start of communication between the communication terminal and the wireless LAN base station to reception of contents from a server by the communication terminal, in addition to reduction in time necessary for a user operation. For example, when a line between a wireless LAN base station and a server is congested, or when a long time is spent for authentication of the communication terminal and the server, there may be a case where the communication terminal is hardly able to transmit/receive information during passing through a spot communication area. In a worst case, there may be a case where no communication can be performed since the communication terminal has passed over the spot communication area before start of communication.

Various countermeasures have been considered against the above-described problem. For example, disclosed in Japanese Laid-Open Patent Publication No. 2004-048395 (hereinafter, referred to as Patent Document 1) is a portable information terminal wireless LAN service so as to provide a system that distributes information to a portable information terminal passing through a communication area of a wireless LAN base station. FIG. 24 is a block diagram illustrating a configuration of a conventional portable information terminal wireless LAN service system disclosed in patent document 1. In FIG. 24, suppose that a portable information terminal (PDA) 2001 is owned by a user who, in advance, subscribes to an information service through a mobile phone, a PHS, or the like.

The PDA 2001 has a WOR (Wake-on Ring: automatic activation) function, and in addition, has a wireless LAN client software installed thereon. An information provider 2004 is connected to a wake-on server 2005, and a gate server 2002 which are controlled by an agent server 2003. In a spot communication area where information is provided, a wireless LAN base station (not shown) is located so as to perform data transmission/reception with a PDA 2001 owned by a user. When a user owning the PDA 2001 passes through the spot communication area, the wake-on server 2005 causes client software of the PDA 2001 to start. The client software of the PDA 2001 is connected to the gate server 2002 via the wireless LAN base station, and information distributed from the information provider 2004 is stored in a memory of the PDA 2001.

However, even if the technology disclosed in the patent document 1 is used, when it is assumed that a communication terminal moves in a spot communication area or the like at a high speed, time taken by the communication terminal to receive information from the gate server 2002 has not been sufficiently reduced. In Patent Document 1, by having the client software started by the wake-on server 2005, the user operation necessary for connection to the wireless LAN base station has been improved. However, reduction in processing time necessary for server access such as server authentication and the like (usually about several seconds is required for the connection process) is not described therein.

BRIEF SUMMARY OF THE INVENTION

Therefore, an object of the present invention is to solve the above-described conventional problems, and to provide a wireless base station, which is capable of receiving, at a high speed, information requested by a communication terminal moving and passing through a spot communication area at a high speed, and a communication terminal that establishes connection with the wireless base station, and a wireless communication system.

The present invention is directed to a wireless base station connected to a server that distributes contents and to a wireless communication terminal. To achieve the above-described object, the wireless base station of the present invention includes: an external communication control section that controls communication with the server; a contents memory section that stores at least a part of the contents received from the server; an access restriction section that monitors a type of connection with the wireless communication terminal, and restricts access for connection from the wireless communication terminal to the server or to the wireless base station; a wireless communication section that communicates with the wireless communication terminal in accordance with a predetermined communication method; and a control section that controls the wireless communication section. The control section controls the wireless communication section, and establishes connection with the wireless communication terminal by using a first connection which does not substantially require an authentication procedure for connection with the wireless communication terminal, or by using a second connection which requires the authentication procedure for connection with the wireless communication terminal. The access restriction section permits access from the wireless communication terminal to the contents memory section and prohibits access from the wireless communication terminal to the server when the type of connection with the wireless communication terminal is the first connection, and permits access from the wireless communication terminal to both of the contents memory section and the server when the type of connection is the second connection.

Preferably, the control section omits the authentication procedure in the predetermined communication method in the case of using the first connection for connection with the wireless communication terminal, and executes the authentication procedure in the predetermined communication method in the case of using the second connection for connection with the wireless communication terminal.

The contents memory section stores therein contents that are not subjected to access restriction. Alternatively, the contents memory section stores therein contents that are frequently requested from the wireless communication terminal.

In an interval using the first connection, the control section is capable of collecting contents data requested from a plurality of the wireless communication terminals, controlling the wireless communication section, and transmitting the collected contents data, in a broadcasting format, to the plurality of wireless communication terminals.

Preferably, the wireless communication section includes: a first wireless communication section that communicates with the wireless communication terminal in accordance with a first wireless communication method; and a second wireless communication section that communicates with the wireless communication terminal in accordance with a second wireless communication method. Prior to the first wireless communication section starting communication with the wireless communication terminal, the control section controls the second wireless communication section, and transmits, to the wireless communication terminal, profile information that is necessary for the first wireless communication section to communicate with the wireless communication terminal.

The profile information includes communication channel information or identification information of the first wireless communication section. The profile information may further include encrypting information necessary to encrypt the first wireless communication method. Moreover, the profile information may further include startup information that causes the wireless communication terminal to start a communication function based on the first wireless communication method.

Preferably, the second wireless communication section operates by using lower power than the first wireless communication section. The second wireless communication method is a connection method which is capable of establishing connection with the wireless communication terminal in a shorter period of time than the first wireless communication method.

Further, the first wireless communication method may be a broadcasting type communication method that simultaneously transmits information to a plurality of wireless communication terminals. The second wireless communication method may be a broadcasting type communication method that simultaneously transmits information to a plurality of wireless communication terminals.

At least a part of a second wireless communication area, which is an area enabling communication using the second wireless communication method, is located so as to be overlapped with a first wireless communication area, which is an area enabling communication using the first wireless communication method. The second wireless communication area may be located within the first wireless communication area.

Further, the present invention is directed to a wireless communication terminal connected, via a wireless base station, to a server that distributes contents. In order to achieve the above-described object, the wireless communication terminal of the present invention includes: a wireless communication section that communicates with the wireless base station in accordance with a predetermined communication method; a control section that controls the wireless communication section; and a terminal control section that controls transmission of information on a contents request to the wireless base station. The control section controls the wireless communication section, and establishes connection with the wireless communication terminal by using a first connection which does not require an authentication procedure for connection with the wireless communication terminal, or by using a second connection which requires the authentication procedure for connection with the wireless communication terminal.

The wireless communication section receives, from the wireless base station, metadata relating to contents. The terminal control section includes: a user attribute extraction section that extracts user attribute information; and a request contents filter section that filters the metadata received from the wireless base station so as to obtain contents which strongly coincides with the user attribute information, and for generating the information on the contents request.

Preferably, the wireless communication section includes: a first wireless communication section that communicates with the wireless communication terminal in accordance with a first wireless communication method; and a second wireless communication section that communicates with the wireless communication terminal in accordance with a second wireless communication method. Prior to the first wireless communication section starting communication with the wireless communication terminal, the control section controls the second wireless communication section, and transmits, to the wireless communication terminal, profile information that is necessary for the first wireless communication section to communicate with the wireless communication terminal.

Further, the present invention is also directed to a wireless communication system in which a server that distributes contents and a wireless communication terminal are connected to each other via a wireless base station. To achieve the above-described object, the wireless base station includes: an external communication control section that controls communication with the server; a contents memory section that stores at least a part of the contents received from the server; an access restriction section that monitors a type of connection with the wireless communication terminal, and restricts access for connection from the wireless communication terminal to the server or to the wireless base station; a base-station-side wireless communication section that communicates with the wireless communication terminal in accordance with a predetermined communication method; and a base-station-side control section that controls the base-station-side wireless communication section. The base-station-side control section controls the base-station-side wireless communication section, and establishes connection with the wireless communication terminal by using a first connection which does not require an authentication procedure for connection with the wireless communication terminal, or by using a second connection which requires the authentication procedure for connection with the wireless communication terminal. The access restriction section permits access from the wireless communication terminal to the contents memory section and prohibits access from the wireless communication terminal to the server when the type of connection with the wireless communication terminal is the first connection, and permits access from the wireless communication terminal to both of the contents memory section and the server when the type of connection is the second connection.

Further, the wireless communication terminal includes: a terminal-side wireless communication section that communicates with the wireless base station in accordance with a predetermined communication method; a terminal-side control section that controls the terminal-side wireless communication section; and a terminal-side control section that transmits information on a contents request to the wireless base station. The terminal-side control section controls the terminal-side wireless communication section, and establishes connection with the wireless base station by using the first connection which does not require the authentication procedure for connection with the wireless base station, or by using the second connection which requires the authentication procedure for connection with the wireless base station.

According to the present invention, it is possible to provide a wireless base station, which is capable of promptly and stably receiving information from the wireless communication terminal which passes through a spot wireless area at a high speed and which consequently enables transmission/reception of a large amount of information, a wireless communication terminal connected to the wireless base station, and a wireless communication system. That is, it is possible for the wireless communication terminal to reduce time elapsing until receiving contents while passing through a wireless base station to/from which the contents are transmitted/received, and thus a large amount of contents can be transmitted/received.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a diagram showing exemplary tags;

FIG. 18 is a diagram showing a detailed transmission sequence of data transmitted between the integrated base station 101 and the communication terminals 201 and 202;

FIG. 19A is a diagram showing a process flow in the case where a contents memory 11 in the integrated base station 101 is updated;

FIG. 21A is a schematic view illustrating an overall configuration of a wireless communication system according to embodiment 2 of the present invention;

FIG. 21C is a diagram showing an exemplary network configuration of the wireless communication system according to embodiment 2 of the present invention;

FIG. 22 is a block diagram showing an exemplary configuration of an integrated base station 101b according to embodiment 2 of the present invention;

DETAILED DESCRIPTION OF THE INVENTION

Hereinafter, respective embodiments of the present invention will be described with reference to drawings. Generally, in a wireless LAN format, communication between a wireless LAN base station and a communication terminal may be started only after completion of authentication and encryption, which are connection procedures necessary to perform in advance. In this situation, a connection which does not require authentication information such as a password before start of communication and which allows any communication terminal to communicate with a base station without substantially requiring authentication procedures is referred to as a first connection, whereas a connection, which requires the authentication procedures requiring authentication information such as the password is referred to as a second connection.

Embodiment 1

Figure 1:
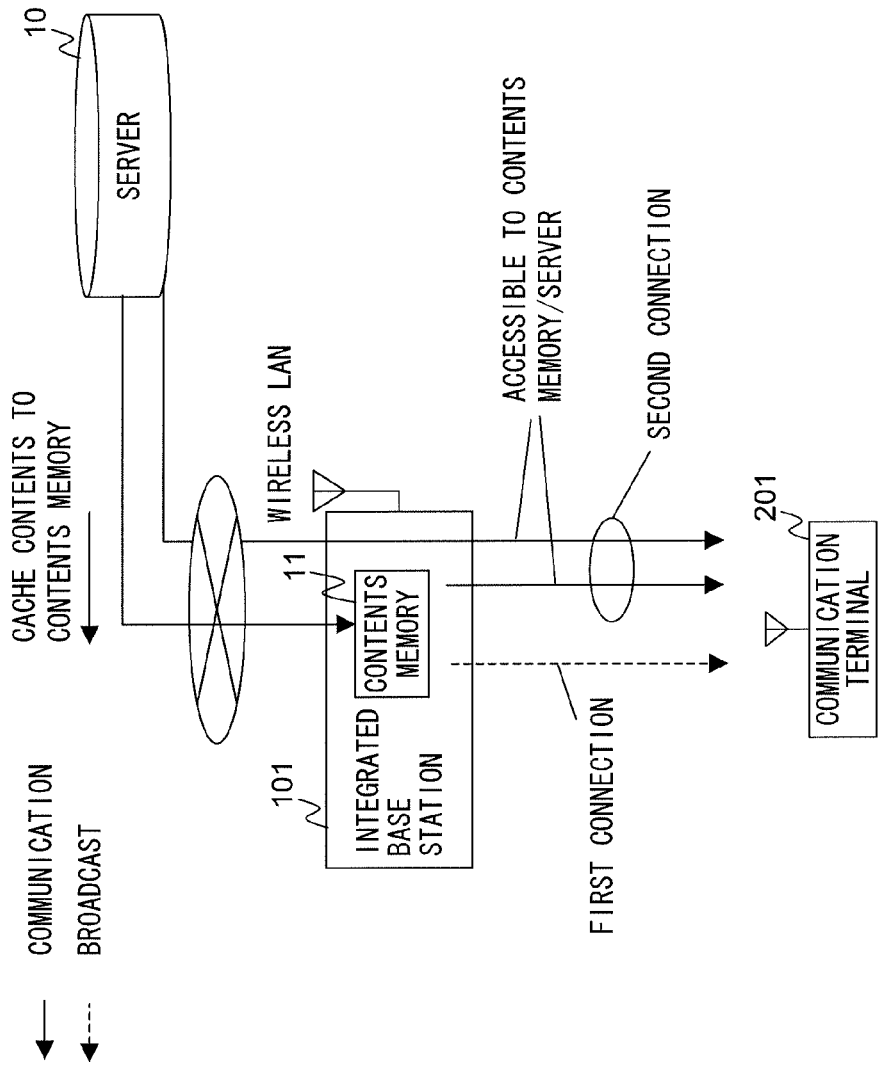
FIG. 1 is a schematic view illustrating an overall configuration of a wireless communication system according to embodiment 1 of the present invention.

FIG. 1 is a schematic view illustrating an overall configuration of a wireless communication system according to embodiment 1 of the present invention. In FIG. 1, the wireless communication system includes an integrated base station (wireless base station) 101, a wireless communication terminal (hereinafter simply referred to as communication terminal) 201, and a server 10. The integrated base station 101 is connected to the server 10, which is capable of distributing information relating to various kinds of contents, by using wireless or wired communication. The integrated base station 101 includes there inside a contents memory 11 for storing therein contents. Further, the integrated base station 101 is capable of mutually communicating with the server 10, and has a function of caching the contents received from the server 10 into the contents memory 11.

The communication terminal 201 is a communication terminal capable of receiving information while being moved, and is typified by a portable terminal, a PDA, a car navigation device, a PND (Personal Navigation Device) that is a portable car navigation device, and the like, which are hereinafter collectively referred to as a communication terminal. The communication terminal 201 establishes connection with the integrated base station 101 by using a predetermined communication method (typically, a wireless LAN communication), and in accordance with the connection method, accessible information is restricted. In other words, when the integrated base station 101 is connected to the communication terminal 201 by using the first connection, the communication terminal 201 is able to receive information from the contents memory 11 only. On the other hand, when the integrated base station 101 is connected to the communication terminal 201 by using the second connection, the communication terminal 201 is able to receive information from the contents memory 11 as well as from the server 10.

In the following description, an exemplary case where the communication terminal 201 and the integrated base station 101 are connected to each other by using the wireless LAN communication will be described. The present invention, however, is applicable to all communication methods in which the integrated base station 101 and the communication terminal 201, which transmit and receive contents, operate independently of each other, and are capable of performing spot communication. Therefore, although the explanation will be based on the wireless LAN system for convenience, the present invention is not necessarily limited to the wireless LAN system. For example, a WiMAX in which stations are located so as to form a spot-type isolated wireless area, millimeter-wave communication in which communication is performed by using a millimeter wave, optical communication, and the like are also usable.

Figure 2:
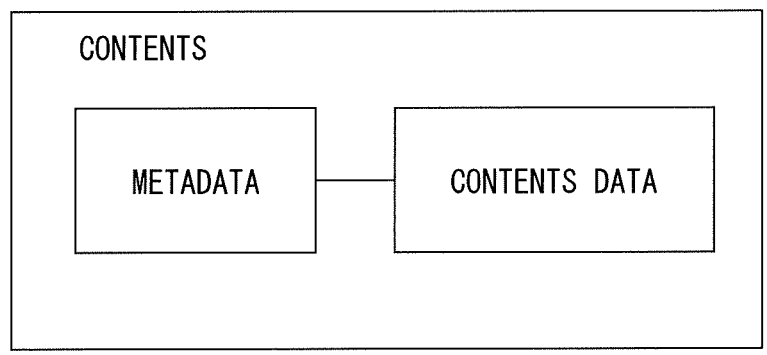
FIG. 2 is a diagram showing exemplary contents data.

With reference to FIG. 2, a definition of contents will be described. The contents include metadata and contents data. The contents data indicates contents of information service, and the metadata indicates information relating to the contents data. When a television program is used as an example of contents, contents of a television program corresponds to the contents data, and genre information such as "news" and "sport", start time of a broadcast program, channel information, and the like correspond to the metadata.

Figure 3:
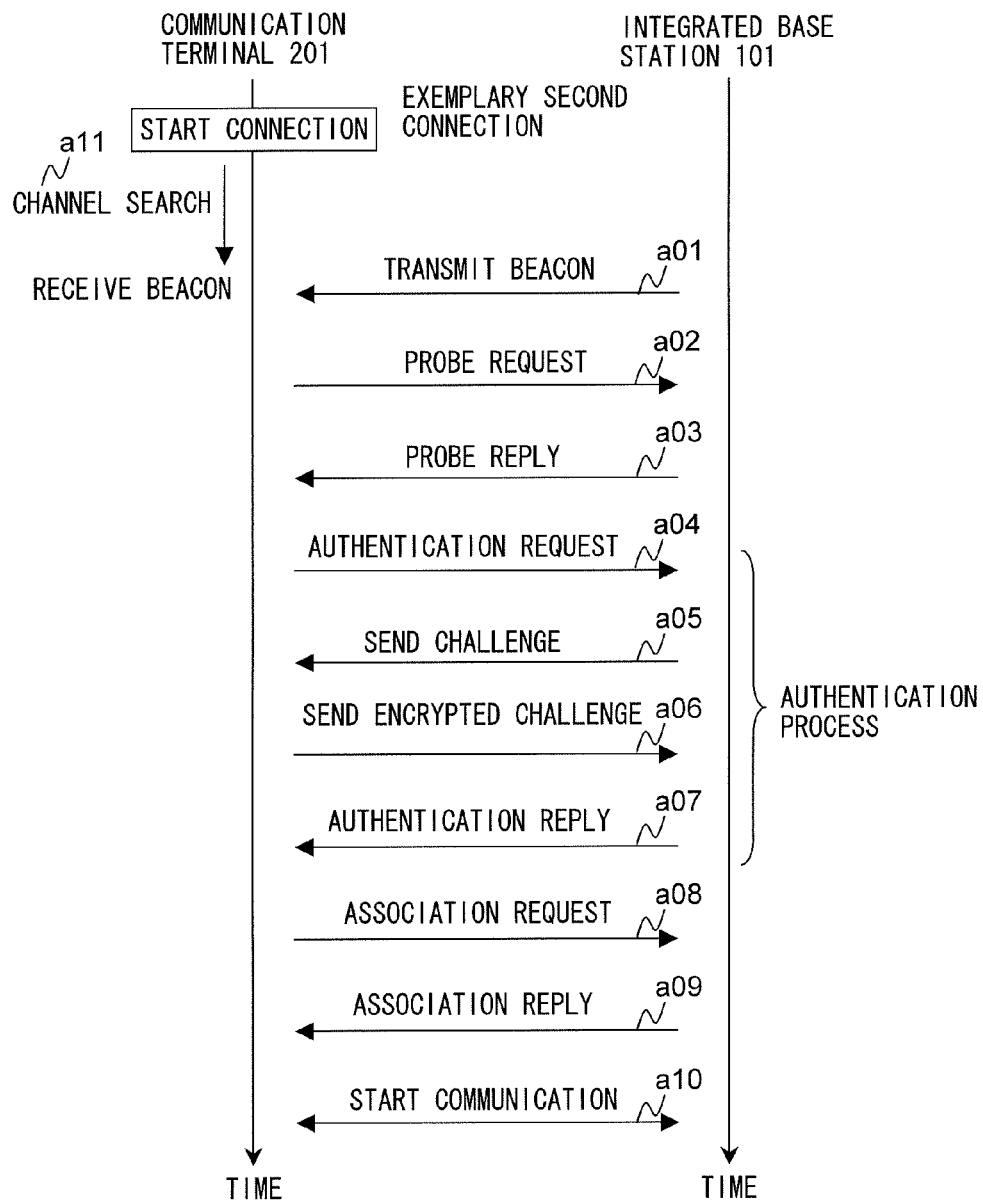
FIG. 3 is a diagram showing exemplary operations performed in a second connection process according to embodiment 1 of the present invention.
Figure 4:
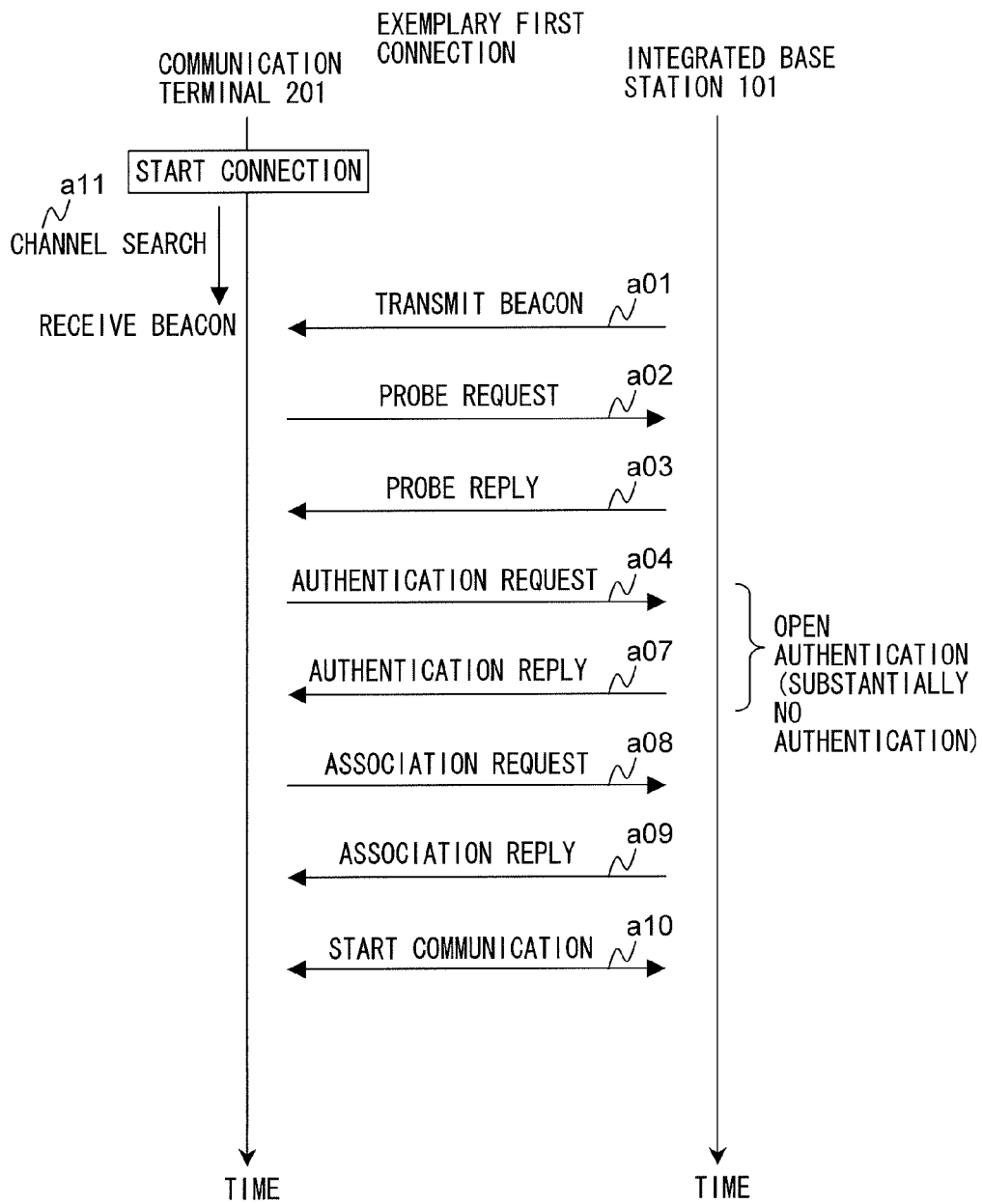
FIG. 4 is a diagram showing exemplary operations performed in a first connection process according to embodiment 1 of the present invention.

Further, with reference to FIGS. 3 and 4, the first connection and the second connection will be described. As shown in FIG. 3, the second connection is a mode in which the integrated base station 101 determines (authenticates) whether or not respective communication terminals 201 are permitted to be connected thereto. As shown in FIG. 4, the first connection is a mode in which the integrated base station 101 substantially permits all communication terminals 201 to be connected thereto (open authentication, substantially no authentication), and is designed to simplify a procedure performed by the integrated base station 101 for determining whether or not connection to the communication terminals 201 are permissible, and to reduce the time elapsing until start of communication between the communication terminals 201 and the integrated base station 101. Details will be described later.

First, the second connection that is a typical authentication process in the wireless LAN communication will be described. FIG. 3 is a sequence diagram illustrating a case where the communication terminal 201 is connected to the integrated base station 101 by using the second connection. As shown in FIG. 3, the communication terminal 201 performs channel search in order to search for a communication channel of the integrated base station 101 (step a11). During the channel search, the communication terminal 201 monitors all channels for a predetermined period of time, and receives a beacon from the integrated base station 101, thereby confirming the presence of the integrated base station 101 having the channel.

The communication terminal 201 receives the beacon transmitted from the integrated base station 101 (step a01). The beacon includes an SSID transmitted from the integrated base station 101. The communication terminal 201 transmits, to the integrated base station 101, the SSID provided to the beacon, that is, a probe request for requesting start of connection (step a02). Upon reception of the probe request, the integrated base station 101 transmits a probe reply to the communication terminal 201 (step a03).

Next, the communication terminal 201 transmits an authentication request to the integrated base station 101 in order to obtain authentication permission from the integrated base station 101 (step a04). Upon reception of the authentication request, the integrated base station 101 performs a determination process for determining whether or not connection to the communication terminal 20 that has performed the authentication request is permissible. For example, in the wireless LAN communication, the determination process for connection permission is performed through an exchange of an encrypted message. Specifically, the integrated base station 101 transmits a random value called "challenge" to the communication terminal 201 (step a05).

Next, the communication terminal 201 encrypts the challenge by using an encryption key, and transmits the encrypted challenge response to the integrated base station 101 (step a06). Upon reception of the encrypted challenge response, the integrated base station 101 decodes the encrypted challenge, and when the decoded challenge corresponds to its original challenge, connection of the communication terminal 201 is permitted. Based on the series of procedures, the integrated base station 101 determines whether or not connection to the communication terminal 201 is permissible, and when the connection is permitted, the authentication response is transmitted to the communication terminal 201 (step a07).

In FIG. 3, an authentication operation for determining whether or not connection to the communication terminal 201 is permissible is referred to as an authentication process. In the authentication process, when the integrated base station 101 determines that connection is permissible, the communication terminal 201 performs an association request for establishing logical connection with the integrated base station 101 (step a08). On the other hand, the integrated base station 101 returns an association reply (step a09). Upon completion of association, the communication terminal 201 and the integrated base station 101 are able to start communication (step a10).

Next, FIG. 4 a sequence diagram showing a case where the communication terminal 201 is connected to the integrated base station 101 by using the first connection. In the first connection, unlike the second connection, upon reception of an authentication request from the communication terminal 201, the integrated base station 101 promptly returns an authentication response. In FIG. 4, authentication between the authentication request in step a04 and the authentication response in step a07 is referred to as an open authentication. The first connection is a simple connection method in which the authentication process of the second connection is replaced with the open authentication. Although the open authentication is referred to as "authentication", the integrated base station 101 promptly returns the authentication response upon reception of the authentication request, as above described, and thus permits connection of all communication terminals 201 substantially without authentication. Therefore, in the authentication process of the second connection shown in FIG. 3, the integrated base station 101 needs time for various significant processes for strictly determining whether or not connection with the communication terminal 201 is permissible. On the other hand, the first connection does not perform such processes, and thus it is possible to reduce time elapsing from start of connection to start of communication as compared to the second connection.

Figure 5:
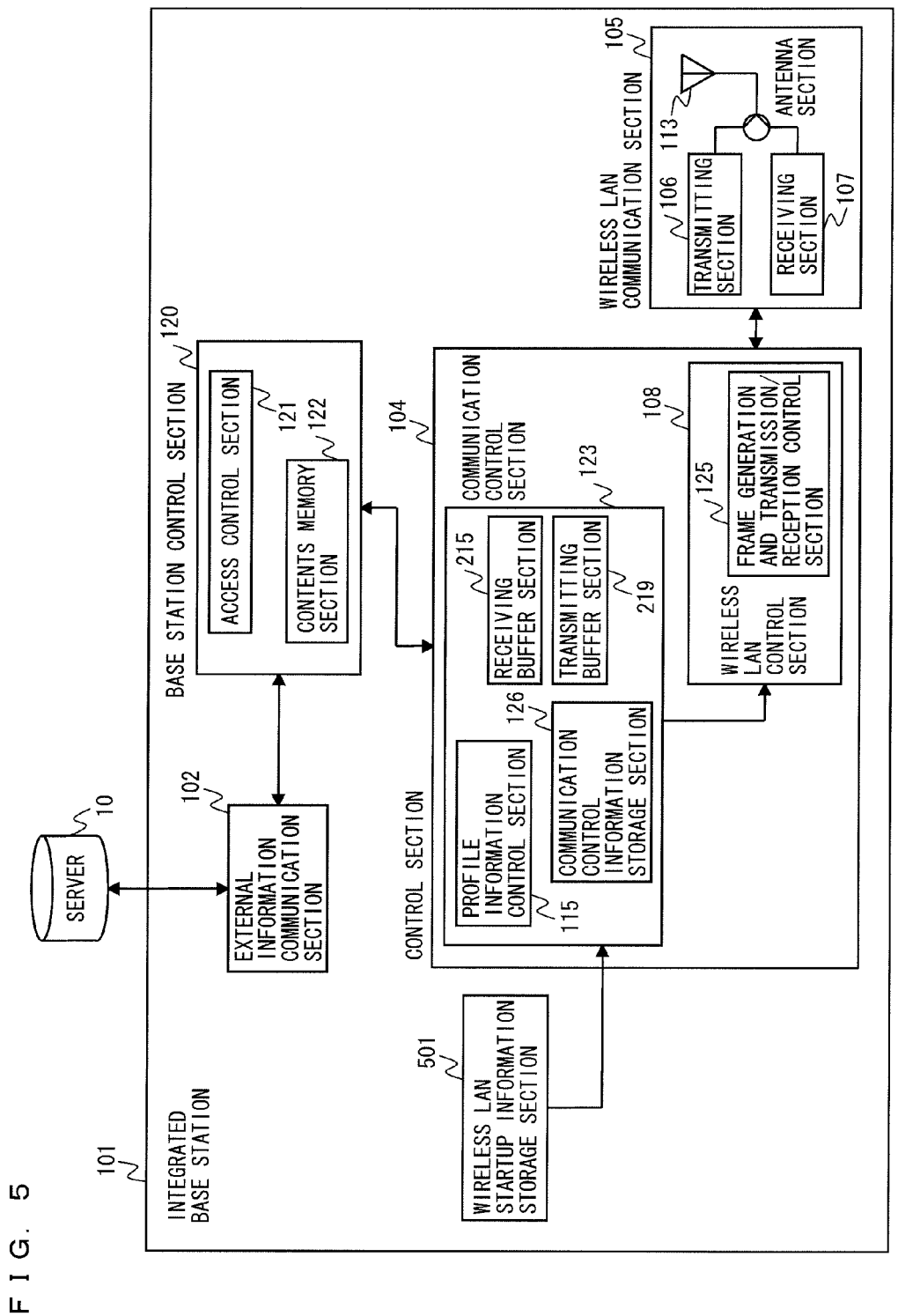
FIG. 5 is a block diagram showing an exemplary configuration of an integrated base station 101 according to embodiment 1 of the present invention.

FIG. 5 is a block diagram showing an exemplary configuration of the integrated base station 101 according to embodiment 1 of the present invention. As shown in FIG. 5, respective sections in the integrated base station 101 are connected via a system bus, and are capable of transferring data mutually. An external information communication section 102 transfers contents information from the server 10 to a memory section, or conversely transfers information from the memory section 103 to the server 10 by using a wired communication technology such as Ethernet (registered trademark) or the like.

The base station control section 120 includes an access control (restriction) section 121 and a contents memory section 122. The access control (restriction) section 121 monitors a connection type of the communication terminal 201 connected to the integrated base station 101, and permits access from the communication terminal 201 to the server 10 and the contents memory section 122 when the connection type is the second connection. On the other hand, when the connection type is the first connection, the access control (restriction) section 121 prohibits access from the communication terminal 201 to the server 10, and only permits access therefrom to the contents memory section 122. The contents memory section 122 mainly caches highly public contents among contents included in the server 10. The highly public contents are, for example, town tourist information, store information, news information, whether information, traffic information, and the like. That is, the contents memory section 122 mainly stores therein contents which are not subjected to access restriction as a result of the authentication of the communication terminal 201. Further, in order to reduce the connection time, the contents memory section 122 may stores therein contents that are very frequently requested from the communication terminal 201.

A control section 104 includes a communication control section 123, and a wireless LAN control section 108. The communication control section 123 is a section for controlling the whole of the integrated base station 101, and includes a profile information control section 115, a communication control information storage section 126, a receiving buffer section 215, and a transmitting buffer section 219. The profile information control section 115 is designed to store therein information (profile information) necessary for the communication terminal 201 to establish connection through communication with the wireless LAN communication section 105.

Here, the profile information will be described. The profile information is a communication channel, identification information (e.g., BSSID), encrypting information (e.g., a WEP key) and the like of the wireless LAN control section 108. The profile information is not limited to the above-described information as long as the information is designed to facilitate high-speed simple connection with the wireless LAN control section 108.

The communication control information storage section 126 stores therein an instruction set for controlling the wireless LAN control section 108. A receiving buffer section 215 is used for buffering information received by the wireless LAN control section 108. In a similar manner, the transmitting buffer section 219 is used for buffering information to be transmitted by using the wireless LAN control section 108.

The wireless LAN control section 108 is a section to control the wireless LAN, and includes a frame generation and transmission/reception control section 125. The wireless LAN communication section 105 includes a transmitting section 106, a receiving section 107, and an antenna section 113. A wireless LAN startup information storage section 501 has information for starting the wireless LAN communication section of the communication terminal 201, and attaches wireless LAN startup information to a packet to be transmitted to the communication terminal 201.

Figure 6:
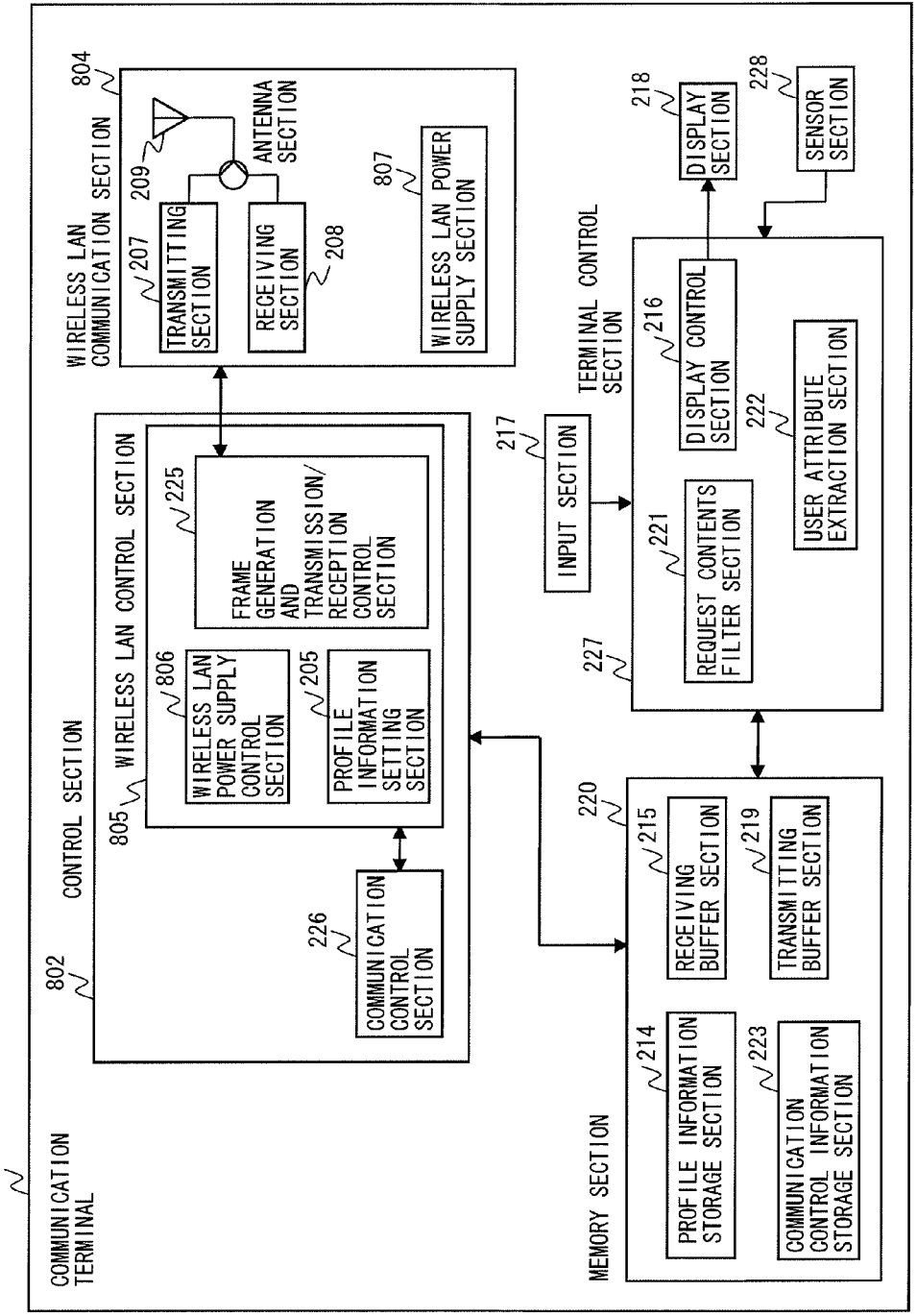
FIG. 6 is a block diagram showing an exemplary configuration of a communication terminal 201 according to embodiment 1 of the present invention.

FIG. 6 is a block diagram showing an exemplary configuration of the communication terminal 201 according to embodiment 1 of the present invention. As shown in FIG. 6, respective sections in the communication terminal 201 are connected via a system bus, and thus are able to transfer data mutually. The communication terminal 201 includes a control section 802, a wireless LAN communication section 804, a memory section 220, an input section 217, a terminal control section 227, a display section 218, and a sensor section 228.

The wireless LAN communication section 804 includes a transmitting section 207, a receiving section 208, an antenna section 209, and a wireless LAN power supply section 807. The control section 802 includes a communication control section 226 and a wireless LAN control section 805. The communication control section 226 controls the wireless LAN control section 805. The wireless LAN control section 805 includes a wireless LAN power supply control section 806, a profile information setting section 205, and a frame generation and transmission/reception control section 225. The profile information setting section 205 obtains, from a profile information storage section 214, profile information of a wireless LAN to be connected, and sets connection information for its own wireless LAN communication.

The memory section 220 is used for storing and buffering data of the communication terminal 201. The memory section 220 includes a profile information storage section 214, a communication control information storage section 223, a receiving buffer section 215, and a transmitting buffer section 219. The profile information storage section 214 stores therein profile information which is received by the communication terminal 201 and is necessary for connection with the integrated base station 101. Further, the communication control information storage section 223 stores therein an instruction set necessary for the communication terminal 201 to perform communication. The input section 217 is a section to which a user operation is inputted.

The terminal control section 227 is a section for controlling a terminal function of the communication terminal 201, and includes a request contents filter section 221, a display control section 216, and a user attribute extraction section 222. The display control section 216 controls information displayed on a display section 218 of the communication terminal 201. The user attribute extraction section 222 extracts an attribute and a preference of a user (hereinafter referred to as user attribute information) in accordance with information from a sensor section 228. The request contents filter section 221 filters metadata received from the integrated base station 101 so as to obtain contents that coincide with the user in accordance with the user attribute information extracted by the user attribute extraction section 222. Request information obtained through filtering by the request contents filter section 221 is transmitted from the communication terminal 201 to the integrated base station 101. Accordingly, the communication terminal 201 receives information that strongly correlates with the preference of the user of the terminal.

Figure 7:
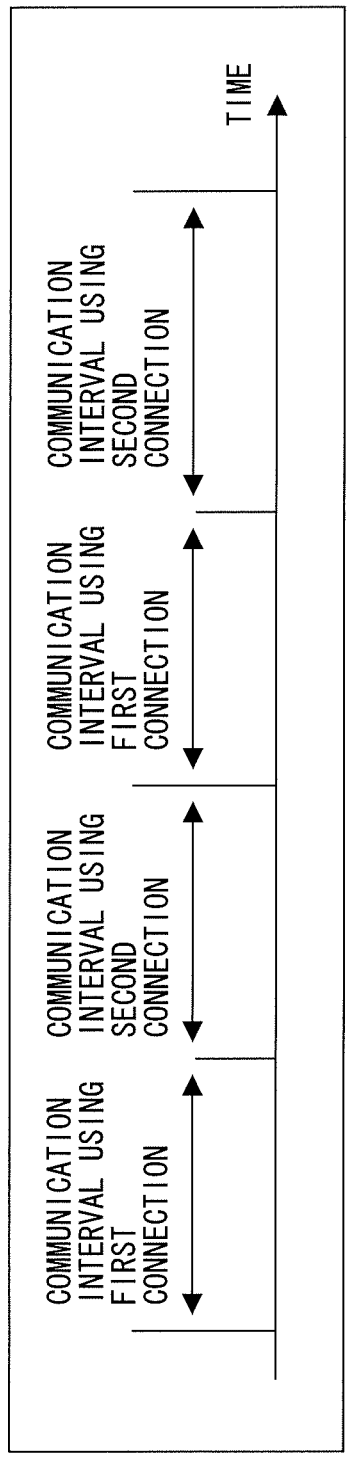
FIG. 7 is a conceptual diagram showing a transmission sequence transmitted from the integrated base station 101 according to embodiment 1 of the present invention.

FIG. 7 shows a schematic diagram of a transmission sequence from the integrated base station 101. One of the features of the present invention is that depending on whether connection between the communication terminal 201 and the integrated base station 101 is established by using the first connection or the second connection, information accessible by the communication terminal 201 is restricted. Accordingly, the integrated base station 101 also needs to have communication intervals using these two connections. As shown in FIG. 7, the integrated base station 101 is configured so as to repeat the communication interval using the first connection and the communication interval using the second connection. The two communication intervals need not have fixed time lengths, and may be changed dynamically. That is, when there is a plurality of the communication terminals 201 performing communication with the integrated base station 101, and most of the communication terminals use the first connection, then it is possible to set the length of the communication interval using the first connection longer. Accordingly, it is possible to effectively utilize a communication band.

Figure 8:
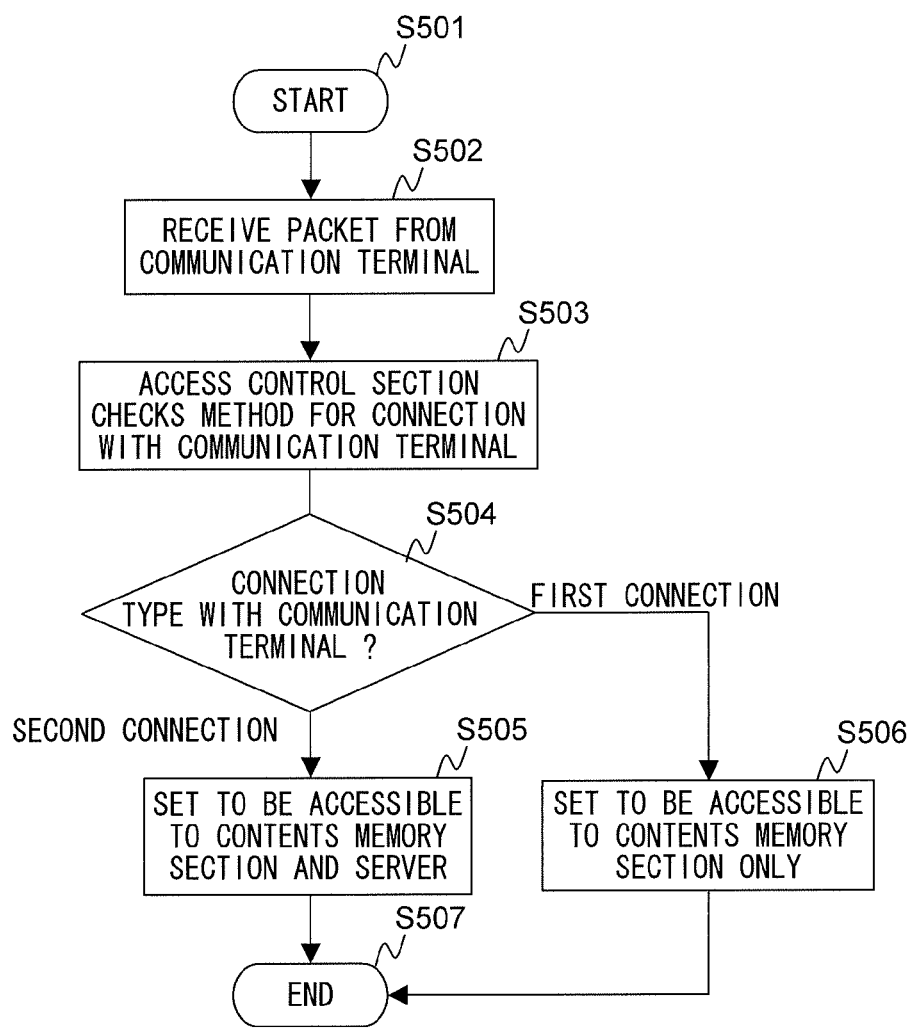
FIG. 8 is a diagram showing exemplary operations of the integrated base station 101 according to embodiment 1 of the present invention.

With reference to FIG. 8, a process flow of the integrated base station 101 (FIG. 6) will be described. As shown in FIG. 8, the integrated base station 101 receives a request packet from the communication terminal 201 (step S502). Next, the access control (restriction) section 121 checks a connection method for connecting with the communication terminal 201 (step S503). When connection with the communication terminal 201 is established by using the second connection, the integrated base station 101 sets such that the communication terminal 201 is accessible to both of the contents memory section 122 and the server 10 (step S505). When the connection with the communication terminal 201 is established by using the first connection, the integrated base station 101 sets such that the communication terminal 201 is accessible to the contents memory section 122 only (step S506).

Here, a method for checking, by the access control (restriction) section 121, the connection method for connecting with the communication terminal 201 and will be described. Various methods may be considered as the method for checking, by the access control (restriction) section 121, the connection method for connecting with the communication terminal 201. For example, the integrated base station 101 may store, in the access control (restriction) section 121 or the like, a MAC address of a communication terminal to be connected thereto and the connection method, so as to identify the connection method for connection with the communication terminal 201 in accordance with a MAC address of a source of a received packet (i.e., the MAC address of the communication terminal 201).

Further, a method may be used in which the integrated base station 101 may have an SSID for the first connection and an SSID for the second connection, such that the communication terminal 201 selects the SSID for connection with the integrated base station 101 in accordance with the first connection and the second connection. Still further, by preparing individual encryption keys (e.g., a WEP key or the like) for the first connection and the second connection, it may be possible for the integrated base station 101 to determine whether the communication terminal 201 has sent a packet by using the first connection or the second connection.

The access control (restriction) section 121 may check the connection method for connecting with the communication terminal 201 by using the above-described methods in a combined manner, or need not necessarily use the methods. For example, the access control (restriction) section 121 may determine that the first connection is used for the connection with the communication terminal 201 when contents of a request packet requested by the communication terminal 201 is stored in the contents memory section 122. On the other hand, the access control (restriction) section 121 may determine that the second connection is used for the connection with the communication terminal 201 when the contents of the request packet requested by the communication terminal 201 is not stored in the contents memory section 122, but in the server 10.

Alternatively, the communication terminal 201 may determine, based on metadata received thereby, the connection method for connection with the integrated base station 101, whereas the access control (restriction) section 121 may determine whether the first connection or the second connection is used in accordance with the connection method determined by the communication terminal 201. In this case, the communication terminal 201 is able to identify, based on the received metadata, whether the requested contents are stored in the integrated base station 101 or in the server 10. When the requested contents are stored in the integrated base station 101, the communication terminal 201 establishes connection with the integrated base station 101 using the first connection. On the other hand, when the requested contents are stored in the server 10, the communication terminal 201 establishes connection with the integrated base station 101 using the second connection.

Figure 9:
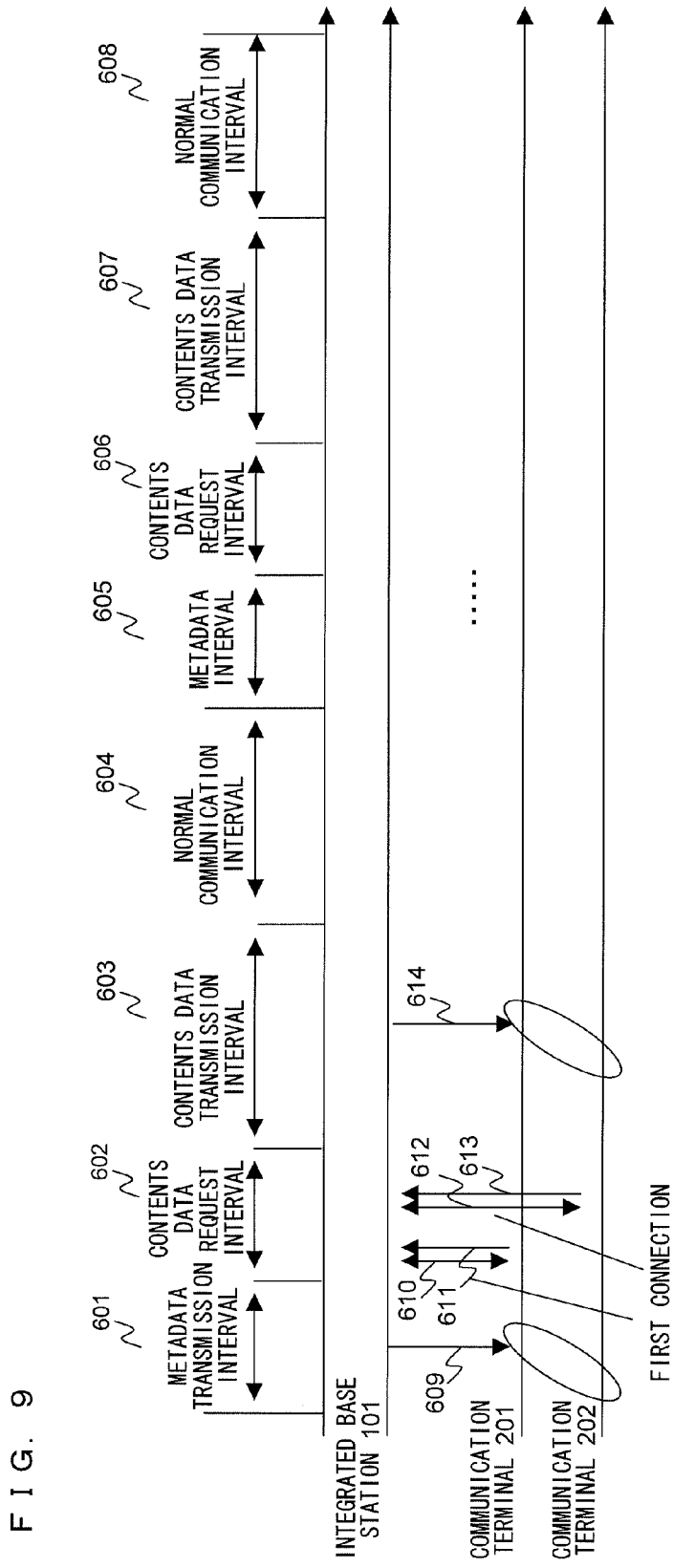
FIG. 9 is a sequence diagram showing, in detail, data transmission between the integrated base station 101 and communication terminals 201 and 202 according to embodiment 1 of the present invention.

Further, another feature of the present invention is that the integrated base station 101 efficiently transmits information while combining broadcasting and communication. FIG. 9 shows, in detail, a data transmission sequence in the present invention. In FIG. 9, data 609 and 614 indicated with ellipses is data transmitted from the integrated base station 101 by using broadcasting. The communication intervals 604 and 608 are each an interval using the second connection. First, the integrated base station 101 broadcasts the metadata 609 in a metadata transmission interval 601 onto a communication terminal 201 and a communication terminal 202. The communication terminals 201 and 202 process the received metadata 609 in their request contents filter sections 221, so as to determine contents data to be requested. The communication terminals 201 and 202 transmit and receive, to and from the integrated base station 10, data 610 and 612 used in a first connection process and requests 611 and 613 for contents data. The integrated base station 101 collects the requested contents data in a contents data transmission interval 603, and broadcasts contents data 614 requested as a result of the collection.

Figure 10:
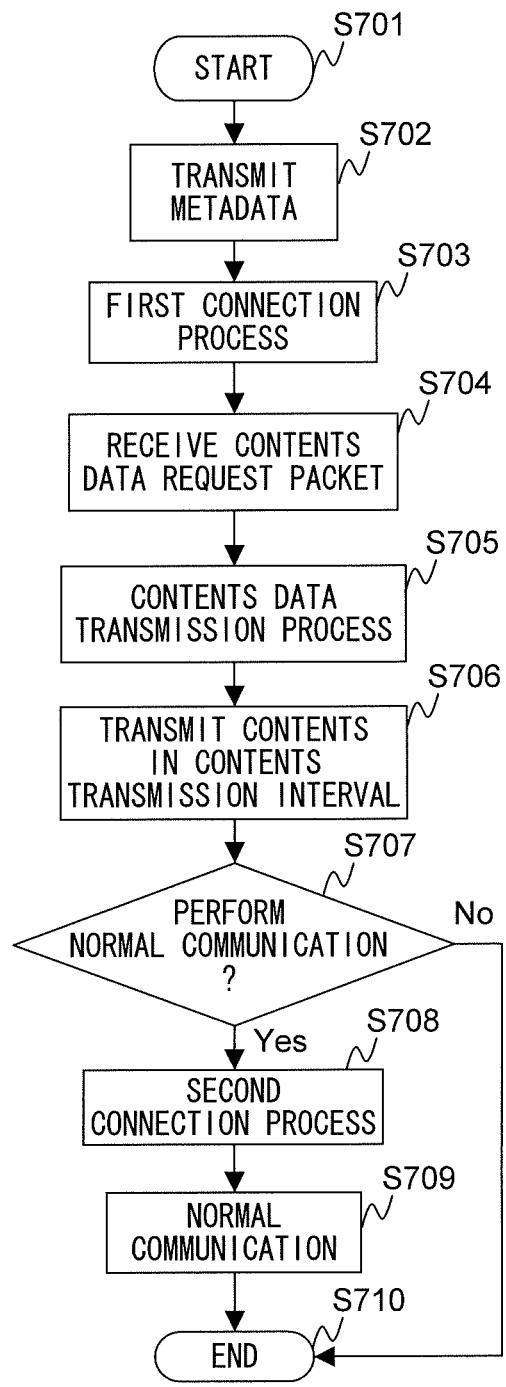
FIG. 10 is a diagram showing exemplary operations of the integrated base station 101 according to embodiment 1 of the present invention.

FIG. 10 shows an exemplary operation performed by the integrated base station 101, in which broadcasting and communication are combined together. As shown in FIG. 9 and FIG. 10, the integrated base station 101 transmits metadata 609 in metadata transmission intervals 601 and 605 (step S702). Next, the integrated base station 101 establishes, by using the first connection, connection with the communication terminal 201 which has received the metadata 609 (step S703). The integrated base station 101 receives contents data request packets 611 and 613 transmitted from the communication terminal 201 in the contents data request intervals 602 and 606 (step S704), and summarizes the contents data request packets so as to generate data to be transmitted (step S705). The integrated base station 101 then transmits the contents data 614 in contents data transmission intervals 603 and 607 (step S706).

Next, when there is a communication terminal 201 requesting a second connection process in normal communication intervals 604 and 608, the integrated base station 101 performs the second connection process for connection with the communication terminal 201 (step S708), and performs normal wireless LAN communication (step S709). When there is no communication terminal 201 requesting the second connection process in the communication intervals 604 and 608, the process is terminated.

Figure 11:
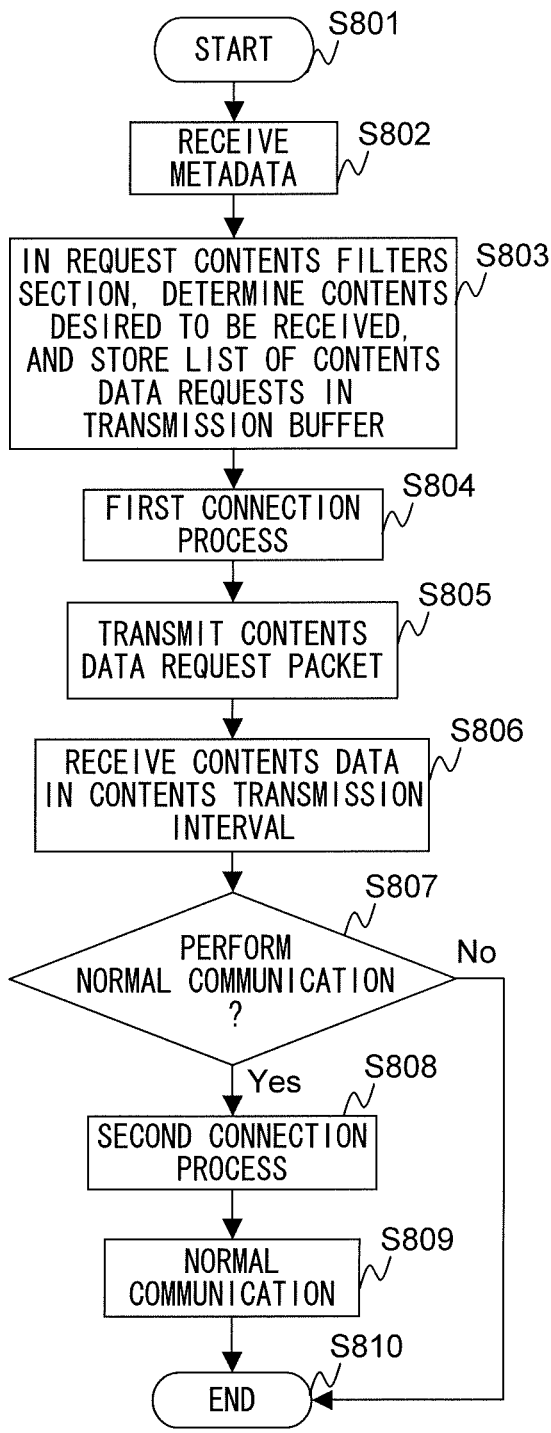
FIG. 11 is a diagram showing exemplary operations of the communication terminal 201 according to embodiment 1 of the present invention.

FIG. 11 shows a process flow of the communication terminal 201. As shown in FIG. 9 and FIG. 11, the communication terminal 201 receives metadata from the integrated base station 101 in metadata transmission intervals 601 and 605 (step S802). Next, the communication terminal 201 determines, in its request contents filter section 221, contents desired to be received, and stores a list of contents data requests in a transmission buffer (step S803). The communication terminal 201 then performs the first connection process for connection with the integrated base station 101 in the contents data request intervals 602 and 606 (step S804), and transmits a contents data request packet to the integrated base station 101 (step S805). Next, the communication terminal 201 receives contents data from the integrated base station 101 in the contents data transmission intervals 603 and 607 (step S806). In the case of requiring more personal information and detailed information, the communication terminal 201 performs normal communication with the integrated base station 101. In the case of performing the normal communication (Yes in step S807), the communication terminal 201 performs the second connection process for connection with the integrated base station 101 (step S808), so as to start the normal communication (step 809). In the case of no normal communication being performed, the process is terminated.

Figure 12:
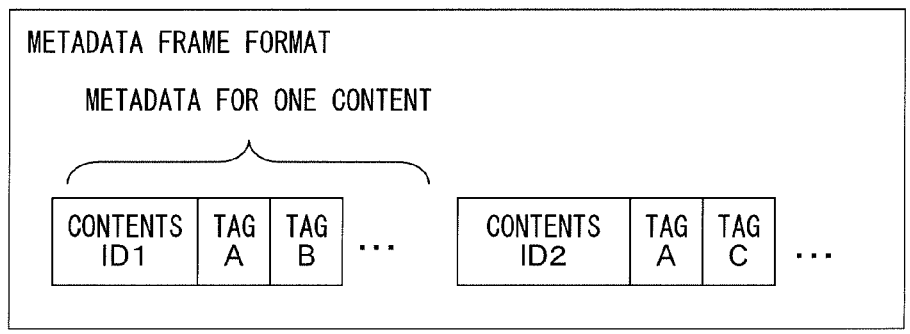
FIG. 12 is a diagram showing an exemplary frame format of metadata.

FIG. 12 shows a frame format of metadata transmitted from the integrated base station 101. As shown in FIG. 12, the metadata transmitted from the integrated base station 101 generally includes data equivalent to a plurality of contents. Metadata corresponding to certain contents has added thereto a contents ID and a tag corresponding to the contents ID.

Figure 13:
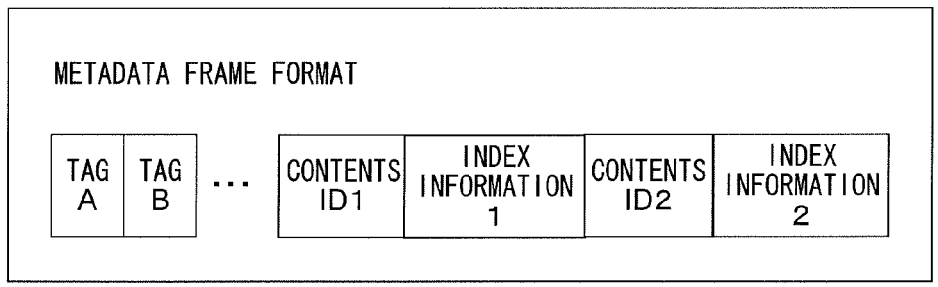
FIG. 13 is a diagram showing an exemplary frame format of the metadata.

The frame format of the metadata is not necessarily limited to such a format shown in FIG. 12 as long as the frame format includes the contents ID and the tag indicative of meta information. For example, a frame format shown in FIG. 13 may be applicable. As shown in FIG. 13, a list of metadata of contents transmitted from the integrated base station 101 is transmitted, and then contents IDs and index information of tags may be added. Accordingly, duplicated tags are not transmitted in a duplicated state, which contributes to reduction in an amount of data to be transmitted.

Figure 14:
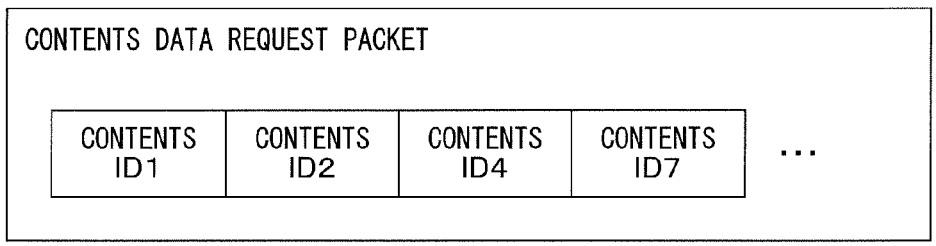
FIG. 14 is a diagram showing an exemplary frame format of a contents data request packet.

FIG. 14 shows an exemplary frame format of a contents data request packet transmitted by the communication terminal 201 to the integrated base station 101. With reference to FIG. 14, the integrated base station 101 transmits requesting contents IDs to the integrated base station 101. In the case of requesting normal data, the communication terminal 201 uses a URL request or the like. However, by assigning ID numbers to contents data cached in the integrated base station 101, it is possible to significantly reduce an amount of data requested by the communication terminal 201.

Figure 15:
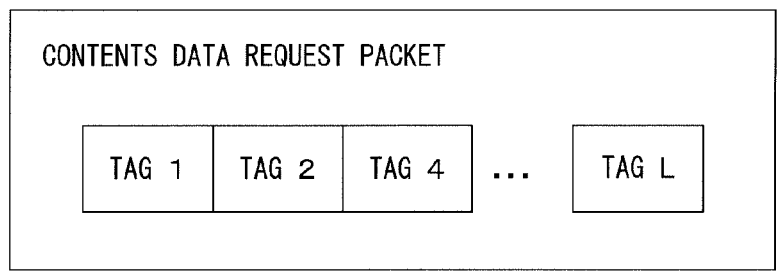
FIG. 15 is a diagram showing an exemplary frame format of the contents data request packet.

The communication terminal 201 need not necessarily use the contents ID for performing contents data request. Instead, as shown in FIG. 15, for example, tags may be used for contents request. Accordingly, in addition that the amount of information of request packets transmitted by the communication terminal 201 is reduced, the communication terminal 201 is able to determine contents desired to be received, in accordance with the tag, instead of individual contents. Thus, it is possible to reduce time required for filtering for obtaining contents to be requested.

FIG. 16 shows exemplary tags. The tag is different from a category in that use of the tag enables addition of a plurality of pieces of attribute information to one piece of information. For example, to movie information, "news" and "entertainment" tags may be added, and to restaurant information, "coupon" and "restaurant" tags may be added. Tags are added to contents, and request for desired contents are performed accordingly, whereby it is possible to request contents suitable to a preference of a user of the communication terminal 201 while a load of a filtering process placed on the communication terminal 201 is reduced.

Figure 17:
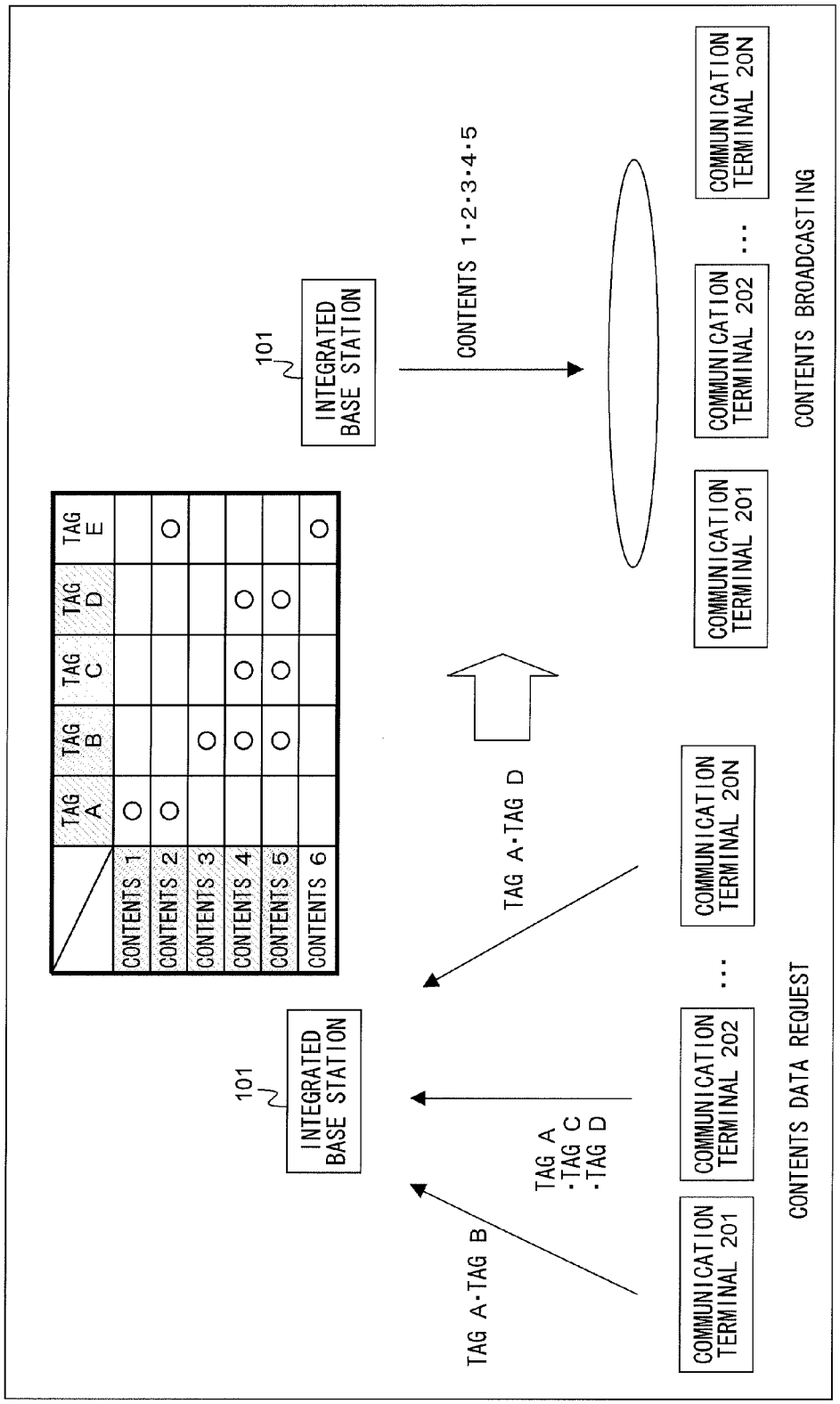
FIG. 17 is a diagram showing a process performed after the integrated base station 101 receives contents data request packets from communication terminals 1 to N until contents are broadcasted.

With reference to FIG. 17, processing from reception of contents data request packets from communication terminals 201 to 20N through to broadcasting of the contents, performed by the integrated base station 101, will be described. The communication terminals 201 to 20N request for tags of their desired contents, respectively. Here, suppose that the communication terminal 201 requests for "tag A" and "tag B", the communication terminal 202 requests for "tag A", "tag C", and "tag D", and the communication terminal 20N requests for "tag A" and "tag D". The integrated base station 101 summarizes tags requested by the communication terminals 201 to 20N, and refers to a table owned thereby. As a result of the summary, the tags requested by the communication terminals 201 to 20N are "tag A", "tag B", "tag C", and "tag D", and thus contents to be transmitted are "contents 1", "contents 2", "contents 3", "contents 4", and "contents 5". The integrated base station 101 broadcasts the summarized contents.

In this manner, the integrated base station 101 summarizes request information from the respective communication terminals 201 to 20N, and broadcasts contents corresponding to the summarized request information, whereby it is possible to minimize an amount of data for transmitting information requested by all the communication terminals 201 to 20N.

As shown in FIG. 18, the integrated base station 101 may be configured so as to broadcast a fixed amount of contents without receiving any request from the communication terminals 201 and 202. In FIG. 18, data 609 and 1501 indicated with ellipses is data transmitted from the integrated base station 101 by using broadcasting. The integrated base station 101 broadcasts metadata 609 onto the communication terminal 201 and the communication terminal 202 in the metadata transmission intervals 601 and 605. In this case, the integrated base station 101 performs broadcasting including metadata of contents that is not cached in the contents memory 11. Next, the integrated base station 101 broadcasts the contents data 1501 onto the communication terminal 201 and the communication terminal 202 in the contents data transmission intervals 603 and 606. The communication terminals 201 and 202 receive, through individual communication, contents that are not broadcasted in normal communication intervals 604 and 608. Specifically, the communication terminals 201 and 202 transmits and receives data 1502 and 1505 used for the first connection process and contents data request packets 1503 and 1506 to and from the integrated base station 101. The integrated base station 101 transmits individually requested contents data 1504 and 1507 to the communication terminals 201 and 202.

Next, a method for determining contents to be broadcasted by the integrated base station 101 in contents data transmission intervals 603 and 606 will be described. In the contents data transmission intervals 603 and 606 in the integrated base station 101, it is preferable to broadcast information very frequently requested by the communication terminals 201 and 202. This is because frequency of individual requests of the contents data is reduced in the normal communication intervals 604 and 608. Data broadcasted by the integrated base station 101 in the contents data transmission intervals 603 and 606 includes contents frequently requested by the communication terminals 201 and 202 in the normal communication intervals 604 and 608, in addition to contents data to be transmitted by all means such as town notice, emergency information, and the like. Probability that contents, among all contents, requested by the communication terminals 201 and 202 are transmitted in the contents data transmission intervals 603 and 606, is defined as a hit rate. In this situation, when information, which is highly requested by the communication terminals 201 and 202 individually in the normal communication intervals 604 and 608, is broadcasted in the contents data transmission intervals 603 and 606, it is possible to raise the hit rate.

FIG. 19A shows a flow chart of updating of the contents memory 11 in the integrated base station 101, based on the method illustrated in FIG. 18. As shown in FIG. 19A, the integrated base station 101 receives from the server 10 contents to be cached in the contents memory 11 (step S1602). Next, the integrated base station 101 determines whether or not to update the contents, and receives the contents again from the server 10 in the case of updating the contents to be cached (Yes in step S1603). On the other hand, in the case of not updating the contents, the process is terminated (step S1604). Determination of whether or not to update the contents is preferably performed regularly, but is not necessarily performed so. Alternatively, a configuration may be possible in which when contents being cached is updated on the server 10, the server 10 provides a trigger, such that the contents being cached in the integrated base station 101 is updated.

Figure 19B:
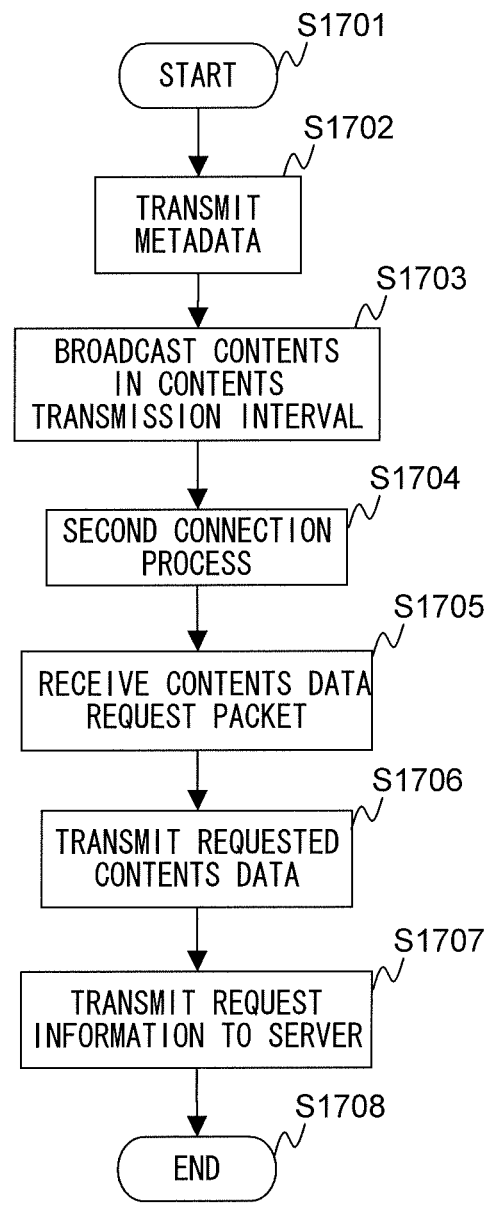
FIG. 19B is a diagram showing a process flow of data transmission/reception in the integrated base station 101.

FIG. 19B shows a flow chart of data transmission/reception performed on the integrated base station 101, based on the method illustrated in FIG. 18. As shown in FIG. 18 and FIG. 19B, the integrated base station 101 transmits metadata 609 in metadata transmission intervals 601 and 605 (step S1702). Next, the integrated base station 101 broadcasts contents data 1501 in contents data transmission intervals 603 and 606 (step S1703). Then, the integrated base station 101 performs the second connection process for connection with the communication terminals 201 and 202 (step S1704), and receives contents data request packets 1503 and 1506 transmitted from the communication terminals 201 and 202 (step S1705). Thereafter, the integrated base station 101 transmits contents data 1504 and 1507 on a request basis (step S1706). Further, the integrated base station 101 transmits request information to the server 10 in order to improve the hit rate (step S1707).

Figure 20:
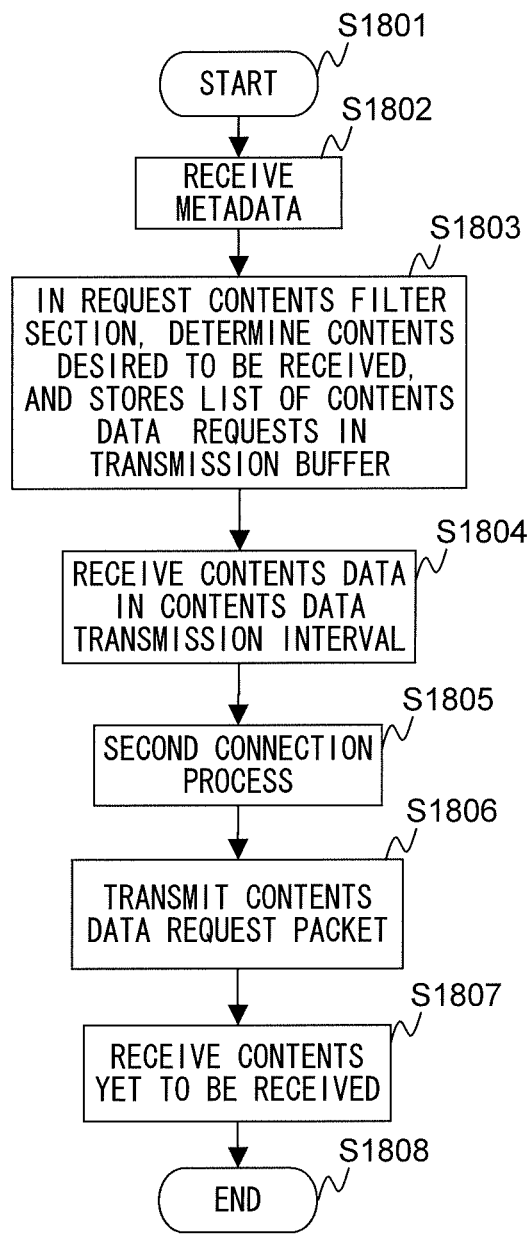
FIG. 20 is a diagram showing a process flow of data transmission/reception in the communication terminal 201.

FIG. 20 shows a flow chart of data transmission/reception performed on the communication terminal 201, based on the method illustrated in FIG. 18. As shown in FIG. 18 and FIG. 20, the communication terminal 201 receives the metadata 609 from the integrated base station 101 in the metadata transmission intervals 601 and 605 (step S1802). Next, the communication terminal 201 determines, in its request contents filter section 221, contents desired to be received, and stores a list of contents data requests in a transmission buffer (step S1803). Next, the communication terminal 201 receives contents data 1501 in the contents data transmission intervals 603 and 606 (step S1804). Then communication terminal 201 performs, in the normal communication intervals 604 and 608, the second connection process for connection with the integrated base station 101 in order to receive, in contents data transmission intervals 603 and 606, contents data yet to be broadcasted (step S1805), and transmits contents data request packet 1503 to the integrated base station 101 (step S1806). The communication terminal 201 finally receives contents data 1504 that is yet to be broadcasted or received, in the normal communication interval 604 and 608, from the integrated base station 101 (step S1807).

As described above, according to the present invention, when the integrated base station 101 is connected to the communication terminal 201 by using the first connection, the communication terminal 201 is able to obtain contents stored in the contents memory 11. On the other hand, when the integrated base station 101 is connected to the communication terminal 201 by using the second connection, the communication terminal 201 is able to obtain contents stored in both the contents memory 11 and the server 10. That is, switching between the first connection and the second connection enables reduction in time necessary for the communication terminal 201 to obtain contents while maintaining security.

In the present invention, an external information communication section 102 of the integrated base station 101 performs communication with the server 10. However, the communication need not be wired communication such as the Ethernet (registered trademark). Instead, the communication may be performed with the server 10 by using a wireless LAN, an FWA (Fixed Wireless Access), or the like. Accordingly, it is possible to enhance flexibility in installation of the integrated base station 101.

Embodiment 2

FIG. 21A is a schematic view illustrating an overall configuration of a wireless communication system according to embodiment 2 of the present invention. As shown in FIG. 21A, the wireless communication system according to the present embodiment includes an integrated base station 101b, a communication terminal 201b, and a server 10. In FIG. 21A, the feature of the wireless communication system of the present embodiment is that it is possible, compared to embodiment 1, to reduce time elapsing until start of wireless communication between the integrated base station 101*b* and the communication terminal 201*b*.

Figure 21B:
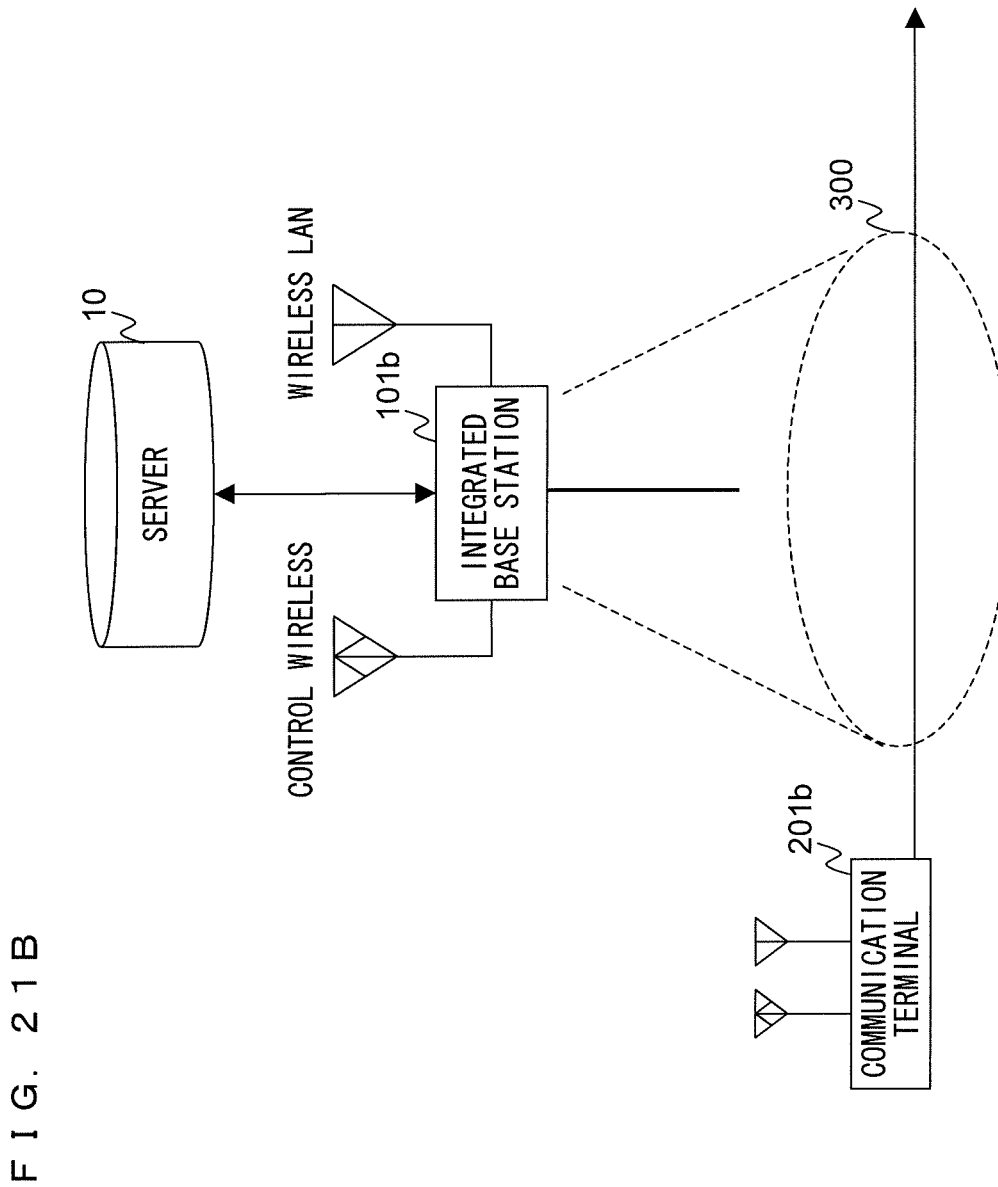
FIG. 21B is a schematic view illustrating a purpose of the wireless communication system according to embodiment 2 of the present invention.

FIG. 21B is a schematic view illustrating an outline of the wireless communication system according to embodiment 2 of the present invention. In FIG. 21B, the wireless communication system according to the present embodiment is based on an assumption, for example, that a moving speed of the communication terminal 201*b* is higher, or that an area for allowing wireless LAN communication with the integrated base station 101*b* (hereinafter, referred to as a wireless LAN communication area) is narrower as compared to embodiment 1. Under such a condition, in the case where the communication terminal 201*b* passes through the wireless LAN communication area, if a long time elapses until start of communication, the communication terminal 201*b* is not able to receive contents since the communication terminal 201*b* passes over a wireless LAN communication area 300 of the integrated base station 101*b* before completion of reception of the contents. Therefore, an object of embodiment 2 is to solve the above-described problem and to allow the integrated base station 101*b* and the communication terminal 201*b* to start wireless communication promptly by using wireless communication (hereinafter referred to as control-wireless communication) other than the wireless LAN communication.

In embodiment 2, in order to reduce time elapsing until start of communication, the control-wireless communication other than the wireless LAN communication is used, and the integrated base station 101*b* and the communication terminal 201*b* mutually exchange communication channel information and SSIDs (i.e., profile information) in advance. Accordingly, for example in FIG. 3, it is possible to reduce time required for searching for a communication channel in the integrated base station 101. In addition, the integrated base station 101*b* transmits beacons at predetermined intervals when the wireless LAN communication is used, and thus it is possible reduce waiting time during which the communication terminal 201*b* waits for transmission of the beacons from the integrated base station 101*b*.

The control-wireless communication may be applicable to all communication methods in which the integrated base station 101*b* and the communication terminal 201*b* operate independently of each other, and which allows spot communication. Since operation in energy saving mode is preferable, the communication method such as a Zigbee may be considered as a prospect. By using the control-wireless communication requiring low power consumption, it is possible to reduce battery consumption in the communication terminal 201*b*. In addition, in the control-wireless communication, the communication terminal 201*b* preferably has a function of automatically waking up from a sleeping state to start communication (WOR: Wake On Radio) when entering a communication area. Accordingly, the communication terminal 201*b* waits while using a saved power in an area outside a communication area, and wakes up from the sleeping state when being moved into the communication area, so as to be automatically connected to the integrated base station 101*b*. Therefore, by using the control-wireless communication, the communication terminal 201*b* constantly searches for an area while using the saved power, and is able to be connected to the integrated base station 101 promptly upon detection of the area.

The Bluetooth may be one of the prospects for low power consumption technology, however, this method does not have the WOR function, and thus it is unfit to utilize Bluetooth to perform the above-described operation. In addition, it is desirable that a process time before start of communication is short. In this regard, Zigbee is more preferable than Bluetooth since Bluetooth requires about several seconds for connection. As another prospect, a DSRC (Dedicated Short Range Communication) system, which is a communication method developed for high-speed vehicles, is able to achieve high-speed connection, and thus is preferable. Since the DSRC is a wireless method capable of transmitting information to a communication terminal at a high speed, use of this method enables the communication terminal to reduce time for transmitting/receiving contents from an integrated base station, and thus this method is also preferable in this regard.

As a physical layer used for the control-wireless communication, various specified low power wireless communication such as a UHF band and the like, and a UWB (Ultra Wide Band) and the like may be used, in addition to the physical layer used for the above-described communication methods. Further, without limiting to the wireless communication, optical communication using an optical beacon, for example, may be used.

FIG. 21C is a diagram showing an exemplary network configuration of the wireless communication system according to the second embodiment of the present invention. In FIG. 21C, the integrated base station 101*b* operates as a wireless LAN base station as well as a control wireless base station. In other words, the integrated base station 101*b* functions as the wireless LAN base station (wireless LAN communication function) to perform wireless LAN communication with the communication terminal 201*b*, and also functions as the control wireless base station (control-wireless communication function) to perform control-wireless communication with the communication terminal 201*b*.

The integrated base station 101*b* transmits profile information of the wireless LAN base station to the communication terminal 201*b* by using the control-wireless communication (1). Hereinafter, the profile information of the wireless LAN base station is simply referred to as profile information. The profile information represents setting information for establishing connection with the wireless LAN base station of the integrated base station 101*b*.

The communication terminal 201*b* has a function (wireless LAN communication function) of communicating with the wireless LAN base station, and also has a function (control-wireless communication function) of communicating with the control wireless base station. The communication terminal 201*b* may have a function of transmitting/receiving various pieces of information (including contents) to/from the server 10 and the integrated base station 101*b*. When passing through a control-wireless communication area 301 of the integrated base station 101*b*, the communication terminal 201*b* receives profile information transmitted from the integrated base station 101*b* by using the control-wireless communication. The control-wireless communication area 301 is an area in which the integrated base station 101*b* is able to perform the control-wireless communication. Further, a wireless LAN communication area 300 is an area in which the integrated base station 101*b* is able to perform the wireless LAN communication. Upon reception of the profile information, the communication terminal 201*b* updates the setting information relating to the wireless LAN communication in accordance with the received profile information (2).

The communication terminal 201*b* starts connection with the wireless LAN base station of the integrated base station 101*b* by using the wireless LAN communication (3), and perform transmission/reception of various pieces of information after completion of connection (4). For the integrated base station 101*b*, it is preferable that the control-wireless communication area 301 is located inside the wireless LAN communication area 300. Accordingly, the communication terminal 201b starts connection with the integrated base station 101b promptly upon reception of the profile information.

FIG. 22 is a block diagram showing an exemplary configuration of the integrated base station 101b according to embodiment 2 of the present invention. In FIG. 22, the integrated base station 101b further includes a control-wireless communication section 110 in contrast to the integrated base station 101 according to embodiment 1. A control section 104 further includes a control wireless control section 109. Respective sections in the integrated base station 101b are connected via a system bus, and thus are able to transfer data mutually. An external information communication section 102 is designed to transfer contents information from the server 10 to a memory 103 by means of a wired communication technology such as Ethernet (registered trademark), or to transfer information in the memory 103 to the server 10, on the contrary.

A base station control section 120 has an access control (restriction) section 121 and a contents memory section 122. The access control (restriction) section 121 monitors a connection type of the communication terminal 201b which is connected to the integrated base station 101b, and permits access from the communication terminal 201b to the server 10 and to the contents memory section 122 when the connection type is the second connection. On the other hand, the access control (restriction) section 121 prohibits the access from the communication terminal 201b to the server 10 when the connection type is the first connection, and permits access to the contents memory section 122 only. The contents memory section 122 mainly caches highly public information among information in the server 10. The highly public information is, for example, typified by town tourist information, store information, news information, weather information, traffic information, and the like.

The control section 104 includes a communication control section 123, a control wireless control section 109, and a wireless LAN control section 108. The communication control section 123 is a section for controlling the whole of the integrated base station 101, and includes a profile information control section 115, a communication control information storage section 126, a receiving buffer section 215, and a transmitting buffer section 219. The profile information control section 115 is designed to store information (profile information) necessary for the communication terminal 201b to establish connection with the wireless LAN communication section 105 through communication. The profile information has been described above.

The communication control information storage section 126 stores therein an instruction set for controlling the control wireless control section 109 and the wireless LAN control section 108. The receiving buffer section 215 is used for buffering information received by the wireless LAN control section 108 and the control wireless control section 109. In a similar manner, the transmitting buffer section 219 is used for buffering information to be transmitted by using the wireless LAN control section 108 and the control wireless control section 109.

The control wireless control section 109 is a section for controlling the control-wireless communication, and includes a frame generation and transmission/reception control section 124 for controlling generation and transmission/reception of a frame. In a similar manner, the wireless LAN control section 108 is a section for controlling the wireless LAN communication, and includes a frame generation and transmission/reception control section 125. The wireless LAN communication section 105 includes a transmitting section 106, a receiving section 107, and an antenna section 113. Further, the control-wireless communication section 110 includes a transmitting section 111, a receiving section 112, and an antenna section 114. The wireless LAN startup information storage section 501 retains information for starting the wireless LAN communication section of the communication terminal 201a, and transmits startup information to the control wireless control section 109, whereby the wireless LAN startup information is attached to a packet transmitted by using control-wireless communication.

Figure 23:
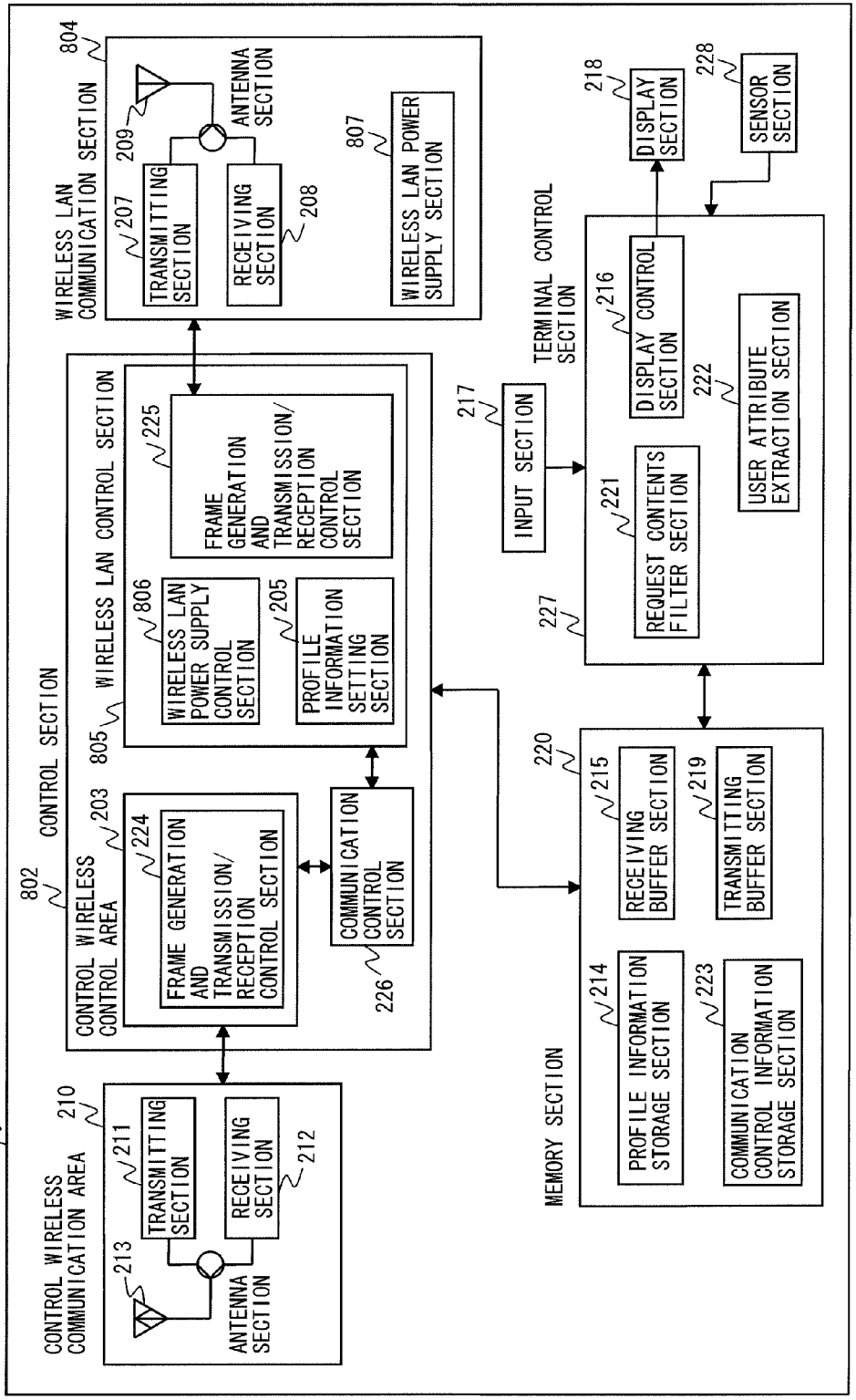
FIG. 23 is a block diagram showing an exemplary configuration of a communication terminal 201b according to embodiment 2 of the present invention.
Figure 24:
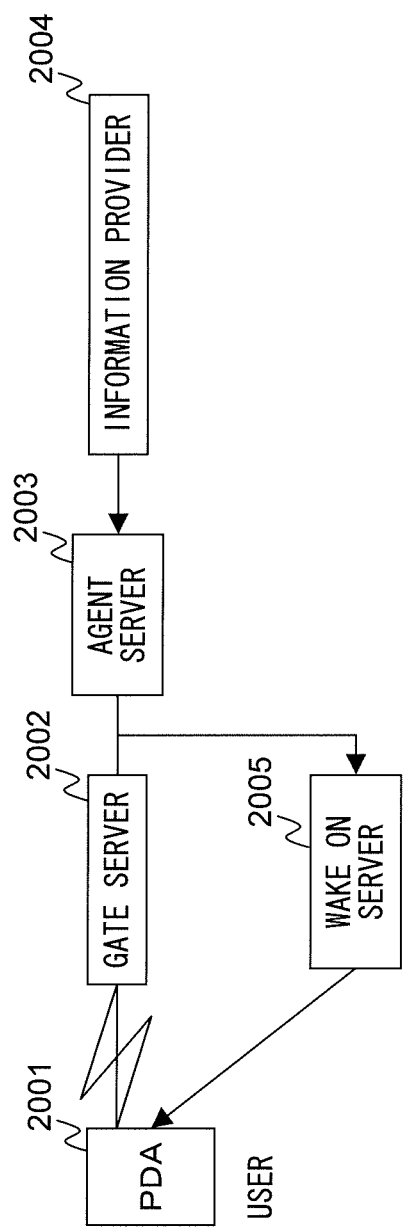
FIG. 24 is a block diagram showing a configuration of a conventional wireless communication system.

FIG. 23 is a block diagram showing an exemplary configuration of the communication terminal 201b according to embodiment 2 of the present invention. As shown in FIG. 23, respective sections in the communication terminal 201b are connected via a system bus, and thus are able to transfer data mutually. A wireless LAN communication section 804 includes a transmitting section 207, a receiving section 208, an antenna section 209, and a wireless LAN power supply section 807. The control-wireless communication section 110 includes a transmitting section 111, a receiving section 112, and an antenna section 113. The control section 802 includes a control wireless control section 203, a communication control section 226, and a wireless LAN control section 805. The communication control section 226 controls the wireless LAN control section 805 and the control wireless control section 203. The control wireless control section 203 includes a frame generation and transmission/reception control section 224 for controlling generation and transmission/reception of a frame. The wireless LAN control section 805 includes a wireless LAN power supply control section 806, a profile information setting section 205, and a frame generation and transmission/reception control section 225. The profile information setting section 205 obtains, from a profile information storage section 214, profile information of the wireless LAN to be connected to, and sets connection information for its own wireless LAN communication.

The memory 220 is used for storing and buffering data of communication terminal 201b, and includes the profile information storage section 214, a communication control information storage section 223, a receiving buffer section 215, and a transmitting buffer section 219. The profile information storage section 214 stores therein profile information which is received by the communication terminal 201b and is necessary for establishing connection with the integrated base station 101b. Further, the communication control information storage section 223 stores therein an instruction set necessary for the communication terminal 201b to perform communication.

The terminal control section 227 is a section for controlling the communication terminal 201b, and includes a request contents filter section 221, a display control section 216, and a user attribute extraction section 222. The display control section 216 controls information to be displayed on the display section 218 of the communication terminal 201b. The user attribute extraction section 222 extracts an attribute and a preference of a user, based on information from a sensor section 228. Based on a user attribute extracted by the user attribute extraction section 222, the request contents filter section 221 filters the metadata received from the integrated base station 101a to obtain contents which are considered to be highly preferred by the user of the communication terminal 201b. The request information obtained through filtering by the request contents filter section 221 is transmitted from the communication terminal 201b to the integrated base station 101a. The communication terminal 201b receives information that strongly correlates with the preference of the user of the terminal.

Description of the process thereafter is the same as that described in embodiment 1, and thus will be omitted.

In embodiment 2 of the present invention, the method has been described in which the integrated base station 101b transmits channel information and SSID information to the communication terminal 201b by using control-wireless communication, so as to establish a high-speed connection with the integrated base station 101b. However, the control-wireless communication may not only transmit information for connecting to the integrated base station 101b rapidly, but may also transmit, for example, the metadata information. Accordingly, the communication terminal 201b is able to obtain contents information retained by the integrated base station 101b without starting the wireless LAN. Thus, when there is no information desired by the communication terminal 201b, the communication terminal 201b is able to operate without starting the wireless LAN, and consequently it is possible to reduce power consumption of the communication terminal 201b.

Further, the integrated base station 101b may transmit contents by using the control-wireless communication. That is, the integrated base station 101b retains, in the contents memory section 122, highly important information, among contents to be transmitted by using the wireless LAN, or simplified information which is obtained by reducing an amount of data of contents to be transmitted by using the wireless LAN, and transmits the information via the control-wireless communication. Accordingly, the following manner of usage may be proposed: a low function terminal including the control-wireless communication only, for example, obtains town information in an audio form, whereas a high function terminal including a wireless LAN function obtains detailed town information having guide maps, recommended spot information, and the like attached thereto by using the wireless LAN.

Further, process procedures performed by the respective function blocks described in the respective embodiments of the present invention may be realized by a CPU interpreting and executing predetermined program data capable of executing the above-described process procedures stored on a storage device (a ROM, a RAM, a hard disc, and the like). In this case, the program data may be introduced into the storage device via a storage medium, or may be directly executed on the storage medium. Here, the storage medium includes: a semiconductor memory such as a ROM, a RAM, a flash memory and the like; a magnetic disc memory such as a flexible disc, hard disc, and the like; an optical disc memory such as a CD-ROM, a DVD, a BD, and the like; and a memory card and the like. Further, the storage medium is a notion including a communication medium such as a phone line, a carrier path, and the like.

Further, each of the respective function blocks described in the respective embodiments of the present invention is typically executed as an LSI, an integrated circuit. The function blocks may be each provided in a chip form, or some or all of the function blocks may be provided in a chip form. The LSI may be referred to as an IC, a system LSI, a super LSI, an ultra LSI depending on the degree of integration.

Further, the method of integration is not limited to the LSI, and may be realized by a dedicated circuit or a general purpose processor. Alternatively, an FPGA (Field Programmable Gate Array) which is programmable after manufacturing the LSI, or a reconfigurable processor enabling reconfiguration of connection or setting of a circuit cell in the LSI may be used. Still alternatively, a configuration may be used in which, in a hardware resource including a processor, a memory, and the like, a control program stored in a ROM is executed by the processor, and then controlled.

Still further, in the case where another integration technology replacing the LSI becomes available due to an improvement of a semiconductor technology or due to emergence of another technology derived therefrom, the function blocks may be integrated using such a new technology. For example, biotechnology may be applied.

The present invention is useful, for example, as a technology which allows a user to receive a large amount of communication contents and to display contents desired by the user when his/her communication terminal passes through a communication area of an access point.

While the invention has been described in detail, the foregoing description is in all aspects illustrative and not restrictive. It is understood that numerous other modifications and variations can be devised without departing from the scope of the invention.

What is claimed:

1. A wireless base station connected to a wireless communication terminal, the wireless base station comprising:
a wireless communication section that communicates with the wireless communication terminal in accordance with a predetermined communication method; and
a control section that controls the wireless communication section,
wherein the control section controls the wireless communication section to establish a connection with the wireless communication terminal by using (i) a first connection which does not require an authentication procedure for connection with the wireless communication terminal, or (ii) a second connection which requires the authentication procedure for connection with the wireless communication terminal,
wherein the wireless communication section includes:
a first wireless communication section that communicates with the wireless communication terminal in accordance with a first wireless communication method; and
a second wireless communication section that communicates with the wireless communication terminal in accordance with a second wireless communication method, and
wherein, prior to the first wireless communication section starting communication with the wireless communication terminal, the control section controls the second wireless communication section, and transmits, to the wireless communication terminal, profile information that is necessary for the first wireless communication section to communicate with the wireless communication terminal.

2. The wireless base station according to claim 1, wherein the wireless base station is connected to a server that distributes contents, the wireless base station further comprising:
an external communication control section that controls communication with the server; and
an access restriction section that monitors a type of connection with the wireless communication terminal, and for restricting access for a connection from the wireless communication terminal to the server or to the wireless base station,
wherein the access restriction section (i) prohibits access from the wireless communication terminal to the server when the type of connection with the wireless communication terminal is the first connection, and (ii) permits access from the wireless communication terminal to the server when the type of connection with the wireless communication terminal is the second connection.

3. The wireless base station according to claim 1, wherein the profile information includes communication channel information or identification information of the first wireless communication section.

4. The wireless base station according to claim 3, wherein the profile information further includes encrypting information necessary to encrypt a first wireless communication performed by the first wireless communication section.

5. The wireless base station according to claim 3, wherein the profile information further includes startup information that causes the wireless communication terminal to start a communication function based on the first wireless communication method.

6. The wireless base station according to claim 1, wherein the second wireless communication section operates by using a lower power than the first wireless communication section.

7. The wireless base station according to claim 1, wherein the second wireless communication method establishes a connection with the wireless communication terminal in a shorter period of time than the first wireless communication method.

8. The wireless base station according to claim 1, wherein the first wireless communication method is a broadcasting type communication method that simultaneously transmits information to a plurality of the wireless communication terminals.

9. The wireless base station according to claim 1, wherein the second wireless communication method is a broadcasting type communication method that simultaneously transmits information to a plurality of the wireless communication terminals.

10. The wireless base station according to claim 1, wherein at least a part of a second wireless communication area, which is an area enabling communication using the second wireless communication method, is overlapped with a first wireless communication area, which is an area enabling communication using the first wireless communication method.

11. The wireless base station according to claim 10, wherein the second wireless communication area is located within the first wireless communication area.

12. A wireless communication terminal connected to a wireless base station, the wireless communication terminal comprising:
a wireless communication section that communicates with the wireless base station in accordance with a predetermined communication method; and
a control section that controls the wireless communication section,
wherein the control section controls the wireless communication section to establish a connection with the wireless base station by using (i) a first connection which does not require an authentication procedure for connection with the base station, or (ii) a second connection which requires the authentication procedure for connection with the wireless base station,
wherein the wireless communication section includes:
a first wireless communication section that communicates with the wireless base station in accordance with a first wireless communication method; and
a second wireless communication section that communicates with the wireless base station in accordance with a second wireless communication method, and
wherein, prior to the first wireless communication section starting communication with the wireless base station, the control section controls the second wireless communication section, and receives, from the wireless base station, profile information that is necessary for the first wireless communication section to communicate with the wireless base station.

13. The wireless communication terminal according to claim 12,
wherein the wireless communication section receives, from the wireless base station, metadata relating to the contents, and
wherein the terminal control section includes:
a user attribute extraction section that extracts user attribute information; and
a request contents filter section that (i) filters the metadata received from the wireless base station so as to obtain contents which strongly coincide with the extracted user attribute information, and (ii) generates the information regarding the contents request.

14. The wireless communication terminal according to claim 12,
wherein the wireless communication section includes:
a first wireless communication section that communicates with the wireless base station in accordance with a first wireless communication method; and
a second wireless communication section that communicates with the wireless base station in accordance with a second wireless communication method, and
wherein, prior to the first wireless communication section starting communication with the wireless base station, the control section controls the second wireless communication section, and transmits, to the wireless base station, profile information that is necessary for the first wireless communication section to communicate with the wireless base station.

15. A wireless communication system comprising a wireless communication terminal and a wireless base station,
wherein the wireless base station comprises:
an access restriction section that monitors a type of connection with the wireless communication terminal, and that restricts access for a connection from the wireless communication terminal to the server or to the wireless base station;
a base-station-side wireless communication section that communicates with the wireless communication terminal in accordance with a predetermined communication method; and
a base-station-side control section that controls the base-station-side wireless communication section,
wherein the base-station-side control section controls the base-station-side wireless communication section to establish a connection with the wireless communication terminal by using (i) a first connection which does not require an authentication procedure for connection with the wireless communication terminal, or (ii) a second connection which requires the authentication procedure for connection with the wireless communication terminal,
wherein the access restriction section (i) prohibits access from the wireless communication terminal to the server when the type of connection with the wireless communication terminal is the first connection, and (ii) permits access from the wireless communication terminal to the server when the type of connection with the wireless communication terminal is the second connection,
wherein the wireless communication terminal comprises:
a terminal-side wireless communication section that communicates with the wireless base station in accordance with a predetermined communication method;

a terminal-side control section that controls the terminal-side wireless communication section; and a terminal-side control section that transmits information regarding a contents request to the wireless base station, wherein the terminal-side control section controls the terminal-side wireless communication section to establish a connection with the wireless base station by using (i) the first connection which does not require the authentication procedure for connection with the wireless base station, or (ii) the second connection which requires the authentication procedure for connection with the wireless base station, wherein the base-station-side wireless communication section includes:

a first base-station-side wireless communication section that communicates with the wireless communication terminal in accordance with a first wireless communication method; and a second base-station-side wireless communication section that communicates with the wireless communication terminal in accordance with a second wireless communication method, and wherein, prior to the first base-station-side wireless communication section starting communication with the wireless communication terminal, the base-station-side control section controls the second base-station-side wireless communication section, and transmits, to the wireless communication terminal, profile information that is necessary for the first base-station-side wireless communication section to communicate with the wireless communication terminal.

16. A method implemented by a wireless base station connected to a wireless communication terminal, the method comprising:

a wireless communication controlling step of controlling communication with the wireless communication terminal, wherein the wireless communication controlling step establishes a connection with the wireless communication terminal by using (i) a first connection which does not require an authentication procedure for connection with the wireless communication terminal, or (ii) a second connection which requires the authentication procedure for connection with the wireless communication terminal, wherein the wireless communication controlling step further comprises:

a first wireless communication controlling step of controlling communication with the wireless communication terminal in accordance with a first wireless communication method; and a second wireless communication controlling step of controlling communication with the wireless communication terminal in accordance with a second wireless communication method, and wherein the second wireless communication controlling step performs transmitting, to the wireless communication terminal, profile information that is necessary for the first wireless communication step.

17. A method implemented by a wireless communication terminal connected to a wireless base station, the method comprising:

a wireless communication step of communicating with the wireless base station in accordance with a predetermined communication method, wherein the wireless communication step establishes a connection with the wireless base station by using (i) a first connection which does not require an authentication procedure for connection with the wireless base station, or (ii) a second connection which requires the authentication procedure for connection with the wireless base station, wherein the wireless communication controlling step further comprises:

a first wireless communication step of communicating with the wireless base station in accordance with a first communication method; and a second wireless communication step of communicating with the wireless base station in accordance with a second communication method, and wherein the second wireless communication controlling step performs receiving, from the wireless base station, profile information that is necessary for the first wireless communication step.

* * * * *